United States Patent
Yoshimura

(10) Patent No.: US 10,744,561 B2
(45) Date of Patent: *Aug. 18, 2020

(54) THREE-DIMENSIONAL DEPOSITION DEVICE

(71) Applicant: MITSUBISHI HEAVY INDUSTRIES, LTD., Tokyo (JP)

(72) Inventor: Hitoshi Yoshimura, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/265,520

(22) Filed: Feb. 1, 2019

(65) Prior Publication Data

US 2019/0160535 A1 May 30, 2019

Related U.S. Application Data

(63) Continuation of application No. 15/300,099, filed as application No. PCT/JP2015/058293 on Mar. 19, 2015, now Pat. No. 10,369,627.

(30) Foreign Application Priority Data

Mar. 31, 2014 (JP) .................................. 2014-074057

(51) Int. Cl.
*B29C 67/00* (2017.01)
*B22F 3/10* (2006.01)
(Continued)

(52) U.S. Cl.
CPC .......... *B22F 3/1007* (2013.01); *B22F 3/1055* (2013.01); *B22F 3/16* (2013.01);
(Continued)

(58) Field of Classification Search
CPC ......... B33Y 10/00; B33Y 30/00; B22F 3/004; B22F 3/005; B22F 3/1055; B22F 3/1056
See application file for complete search history.

(56) References Cited

U.S. PATENT DOCUMENTS 6,046,426 A    4/2000  Jeantette et al.
8,827,681 B2   9/2014  Chen et al.
(Continued)

FOREIGN PATENT DOCUMENTS

CA    2 182 083 C    3/1995
EP    1 637 274 A1   3/2006
(Continued)

OTHER PUBLICATIONS

English translation of the Written Opinion of the International Searching Authority (Form PCT/ISA/237) for International Application No. PCT/JP2015/058293, dated Jun. 16, 2015.
(Continued)

*Primary Examiner* — Joseph S Del Sole
*Assistant Examiner* — Thu Khanh T Nguyen
(74) *Attorney, Agent, or Firm* — Birch, Stewart, Kolasch & Birch, LLP

(57) ABSTRACT

Provided is a three-dimensional deposition device, including: a powder supply unit which supplies a powder material; a light irradiation unit which irradiates the powder material with a light beam so that the powder material irradiated with the light beam is sintered or melted and solidified to form a formed layer; a three-dimensional deposition chamber which is sealed from an outside and accommodates the powder supply unit, the light irradiation unit, and a base unit; a gas discharge unit which discharges a gas inside the three-dimensional deposition chamber; and a gas introduction unit which introduces a predetermined gas into the three-dimensional deposition chamber. When the gas dis-
(Continued)

charge unit discharges a gas inside the three-dimensional deposition chamber and the gas introduction unit introduces a predetermined gas thereinto, a predetermined gas atmosphere is formed inside the three-dimensional deposition chamber.

14 Claims, 11 Drawing Sheets

(51) Int. Cl.
    *B22F 3/16* (2006.01)
    *B33Y 10/00* (2015.01)
    *B33Y 30/00* (2015.01)
    *B22F 3/105* (2006.01)
    *B29C 64/153* (2017.01)
    *B23P 23/04* (2006.01)

(52) U.S. Cl.
    CPC ............ *B23P 23/04* (2013.01); *B29C 64/153* (2017.08); *B33Y 10/00* (2014.12); *B33Y 30/00* (2014.12); *B22F 2003/1056* (2013.01); *Y02P 10/295* (2015.11)

(56) References Cited

U.S. PATENT DOCUMENTS

| | | | |
|---|---|---|---|
| 2009/0042050 A1 | 2/2009 | Matteazzi et al. | |
| 2011/0291331 A1 | 12/2011 | Scott | |
| 2013/0287590 A1 | 10/2013 | Neuhaeusler et al. | |
| 2014/0265049 A1* | 9/2014 | Burris ................... | B33Y 10/00 425/135 |
| 2017/0036300 A1* | 2/2017 | Takashima ........... | B23K 26/342 |

FOREIGN PATENT DOCUMENTS

| | | |
|---|---|---|
| EP | 3 028 841 A1 | 6/2016 |
| EP | 3 068 605 A1 | 9/2016 |
| JP | 3-146606 A | 6/1991 |
| JP | 8-260162 A | 10/1996 |
| JP | 10-501463 A | 2/1998 |
| JP | 2005-105414 A | 4/2005 |
| JP | 2006-124732 A | 5/2006 |
| JP | 2010-265530 A | 11/2010 |
| JP | 2011-127192 A | 6/2011 |

OTHER PUBLICATIONS

European Office Action dated Nov. 16, 2018 for Application No. 15 772 299.2.
Extended European Search Report dated Mar. 8, 2017 in corresponding European Patent Application 15 772 299.2.
International Search Report for PCT/JP2015/058293 (PCT/ISA/210) dated Jun. 16, 2015.
Japanese Notification of Reasons for Refusal, dated Sep. 12, 2017, for Japanese Application No. 2014-074057, as well as a English machine translation.
Office Action dated Mar. 29, 2017 received in correspondingTaiwanese Patent Application No. 104110111 with an English Translation.
Written Opinion of the International Searching Authority for PCT/JP2015/058293 (PCT/ISA/237) dated Jun. 16, 2015.
Japanese Office Action, dated Feb. 19, 2019, for Japanese Application No. 2018-089917, along with an English translation.

* cited by examiner

THREE-DIMENSIONAL DEPOSITION DEVICE

CROSS-REFERENCE TO RELATED APPLICATIONS

This application is a Continuation of copending application Ser. No. 15/300,099, filed on Sep. 28, 2016, which was filed as PCT International Application No. PCT/JP2015/058293 on Mar. 19, 2015, which claims the benefit under 35 U.S.C. § 119(a) to Patent Application No. 2014-074057, filed in Japan on Mar. 31, 2014, all of which are hereby expressly incorporated by reference into the present application.

FIELD

The present invention relates to a three-dimensional deposition device used to manufacture a three-dimensional object by deposition.

BACKGROUND

As a technology of manufacturing a three-dimensional object, there is known a deposition shaping technology of manufacturing a three-dimensional object by irradiating a metallic powder material with a light beam. For example, Patent Literature 1 discloses a method in which a powder layer formed of a metallic powder material is irradiated with a light beam so that a sintered layer is formed and this process is repeated so that a plurality of sintered layers are integrally deposited to form a three-dimensional object.

CITATION LIST

Patent Literature

Patent Literature 1: Japanese Laid-open Patent Publication No. 2006-124732

SUMMARY

Technical Problem

Incidentally, there is a case where a change in quality occurs in a metallic powder material, for example such as oxidizing, when the three-dimensional object is manufactured. When such a change in quality occurs in the metallic powder material, there is a possibility that the quality of the three-dimensional object may be deteriorated.

An object of the invention is to provide a three-dimensional deposition device that suppresses deterioration in quality of a three-dimensional object.

To solve the problem and achieve the object above, a three-dimensional deposition device of this invention forms a three-dimensional object by depositing a formed layer on a base unit, includes: a powder supply unit which supplies a powder material; a light irradiation unit which irradiates the powder material with a light beam and sinters or melts and solidifies at least a part of the powder material irradiated with the light beam to form the formed layer; a three-dimensional deposition chamber which is sealed from an outside and accommodates the powder supply unit, the light irradiation unit, and the base unit therein; a gas discharge unit which discharges a gas inside the three-dimensional deposition chamber; and a gas introduction unit which introduces a predetermined gas into the three-dimensional deposition chamber, wherein a predetermined gas atmosphere is formed inside the three-dimensional deposition chamber when the gas discharge unit discharges a gas inside the three-dimensional deposition chamber and the gas introduction unit introduces the predetermined gas into the three-dimensional deposition chamber.

The three-dimensional deposition device forms a formed layer under a predetermined sealed gas atmosphere. Thus, the three-dimensional deposition device can suppress deterioration in quality of the three-dimensional object by suppressing a change in the powder material.

It is preferable that in the three-dimensional deposition device, the powder supply unit injects the powder material from an opening of a front end thereof toward the base unit, the light irradiation unit irradiates the powder material feeding from the powder supply unit toward the base unit with the light beam from the opening of the front end thereof so that the powder material is melted and the melted powder material is solidified on the base unit, and the three-dimensional deposition chamber accommodates the opening of the powder supply unit and the opening of the light irradiation unit. Since the three-dimensional deposition device forms the formed layer under a predetermined gas atmosphere, it is possible to suppress deterioration in quality of the three-dimensional object.

It is preferable that in the three-dimensional deposition device, the powder supply unit is concentrically disposed on an outer periphery of the light irradiation unit, the powder supply unit and the light irradiation unit forms a deposition unit which includes an inner tube surrounding a path causing the light beam of the light irradiation unit to pass therethrough and an outer tube covering the inner tube and forming a powder passage causing the powder material to flow therethrough between the inner tube and the outer tube, and the deposition unit is movable in one direction, and the three-dimensional deposition device includes a telescopic unit which is attached to the deposition unit and expands and contracts in the one direction while sealing the three-dimensional deposition chamber from the outside, in accordance with the movement of the deposition unit. Since the three-dimensional deposition device includes a telescopic unit, it is possible to preferably seal the inside of the three-dimensional deposition chamber even when the powder supply unit moves.

It is preferable that in the three-dimensional deposition device, the deposition unit is movable only in one axis direction. Accordingly, the telescopic unit sealing the inside of the three-dimensional deposition chamber is disposed to be movable in a telescopic manner in one axis direction. The telescopic unit can expand and contract while decreasing a load involving with the telescopic unit and thus the inside of the three-dimensional deposition chamber can be further appropriately sealed. Accordingly, it is possible to minimize the configuration of the device and to further easily keep the sealing property compared with the case where the deposition unit is moved in a multi-axis direction.

It is preferable that the three-dimensional deposition device includes a cover unit which is attached to the powder supply unit and the light irradiation unit and covers a part in which the formed layer of the base unit is formed; a cover gas discharge unit which discharges a gas inside the cover unit; and a cover gas introduction unit which introduces a predetermined gas into the cover unit, wherein when the cover gas discharge unit discharges a gas inside the cover unit and the cover gas introduction unit introduces the predetermined gas thereinto, the cover unit forms the predetermined gas atmosphere in the periphery of the base unit.

The three-dimensional deposition device sets a predetermined gas atmosphere in the periphery of the formed layer by the cover unit. Thus, the three-dimensional deposition device can further appropriately suppress deterioration in quality of the three-dimensional object.

It is preferable that the three-dimensional deposition device includes a spare chamber which connects the three-dimensional deposition chamber to the outside of the three-dimensional deposition chamber and is sealed from the three-dimensional deposition chamber and the outside of the three-dimensional deposition chamber, wherein the base unit is moved from the outside of the three-dimensional deposition chamber into the three-dimensional deposition chamber through the spare chamber so that the base unit is accommodated in the three-dimensional deposition chamber. Since the three-dimensional deposition device includes the spare chamber, it is possible to further appropriately introduce or discharge a gas into or out of the three-dimensional deposition chamber even when the base unit is carried into or out of the three-dimensional deposition chamber.

Advantageous Effects of Invention

According to the invention, it is possible to suppress deterioration in quality of a three-dimensional object.

DESCRIPTION OF EMBODIMENTS

Hereinafter, preferred embodiments of the invention will be described in detail with reference to the accompanying drawings. Further, the invention is not limited to the embodiment. Then, when there are a plurality of embodiments, a combination of the embodiments may be employed.

First Embodiment

Figure 1:
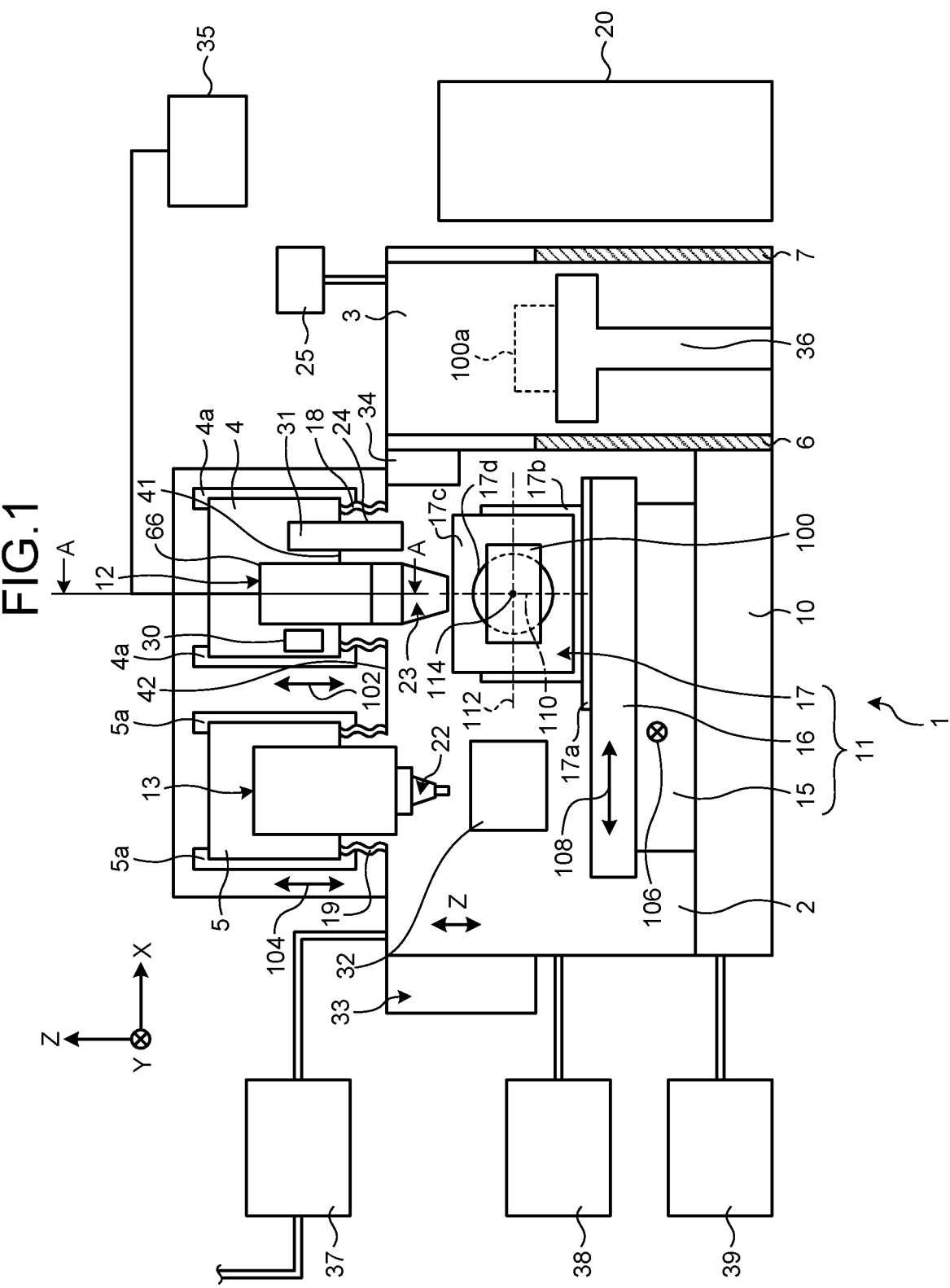
FIG. 1 is a schematic diagram illustrating a three-dimensional deposition device according to a first embodiment.

FIG. 1 is a schematic diagram illustrating a three-dimensional deposition device 1 of a first embodiment. Here, in the first embodiment, one direction within a horizontal plane will be set as an X-axis direction, a direction orthogonal to the X-axis direction within the horizontal plane will be set as a Y-axis direction, and a direction (a vertical direction) orthogonal to each of the X-axis direction and the Y-axis direction will be set as a Z-axis direction.

The three-dimensional deposition device 1 illustrated in FIG. 1 is a device that manufactures a three-dimensional object on a base unit 100. The base unit 100 is a base member on which the three-dimensional object is formed. The base unit 100 is carried to a predetermined position of the three-dimensional deposition device 1 so that the three-dimensional object is formed on a surface thereof. The base unit 100 of the first embodiment is a plate-shaped member. Further, the base unit 100 is not limited thereto. As the base unit 100, a base member of the three-dimensional object may be used or a member adding the three-dimensional object may be used. A member corresponding to a component or a product, by forming the three-dimensional object at a predetermined position, may be used as the base unit 100.

The three-dimensional deposition device 1 includes a three-dimensional deposition chamber 2, a spare chamber 3, a deposition head accommodation chamber 4, a machining unit accommodation chamber 5, a bed 10, a table unit 11, a deposition head 12 which is a deposition unit, a machining unit 13, a bellows 18, a bellows 19, a control device 20, a shape measurement unit 30, a heating head 31, a machining measurement unit 32, a tool exchange unit 33, a nozzle exchange unit 34, a powder introduction unit 35, a base movement unit 36, a gas discharge unit 37, a gas introduction unit 38, and a powder collection unit 39.

The three-dimensional deposition chamber 2 is a casing (a chamber) in which a part other than a designed communication part such as a connection pipe is sealed from the outside. Additionally, the designed communication part is provided with a valve that switches a sealed state and an opened state. If necessary, the three-dimensional deposition chamber 2 can be sealed. The three-dimensional deposition chamber 2 includes therein the bed 10, the table unit 11, a part of the deposition head 12, a part of the machining unit 13, a part of the heating head 31, the machining measurement unit 32, the tool exchange unit 33, and the nozzle exchange unit 34.

The spare chamber 3 is provided adjacent to the three-dimensional deposition chamber 2. In the spare chamber 3, a part other than a designed communication part such as a connection pipe is sealed from the outside and the three-dimensional deposition chamber 2. The spare chamber 3 is formed as a decompression chamber which connects the outside and the three-dimensional deposition chamber 2 to each other. The base movement unit 36 is provided inside the spare chamber 3. Here, the spare chamber 3 is formed so that, for example, an airtight door 6 is provided at the connection part with the three-dimensional deposition chamber 2. Further, the spare chamber 3 is connected to the outside by the airtight door 7. Further, the spare chamber 3 is provided with a spare chamber gas discharge unit 25 which discharges a gas such as air from the spare chamber 3. When the door 7 is opened, a necessary member can be carried into the spare chamber 3 from the outside. Further, when the door 6 is opened, a member can be carried between the spare chamber 3 and the three-dimensional deposition chamber 2. That is, when the door 7 is closed, the spare chamber 3 is isolated from the outside so that the spare chamber is sealed from the outside. Further, when the door 6 is closed, the spare chamber 3 is isolated from the three-dimensional deposition chamber.

Figure 2:
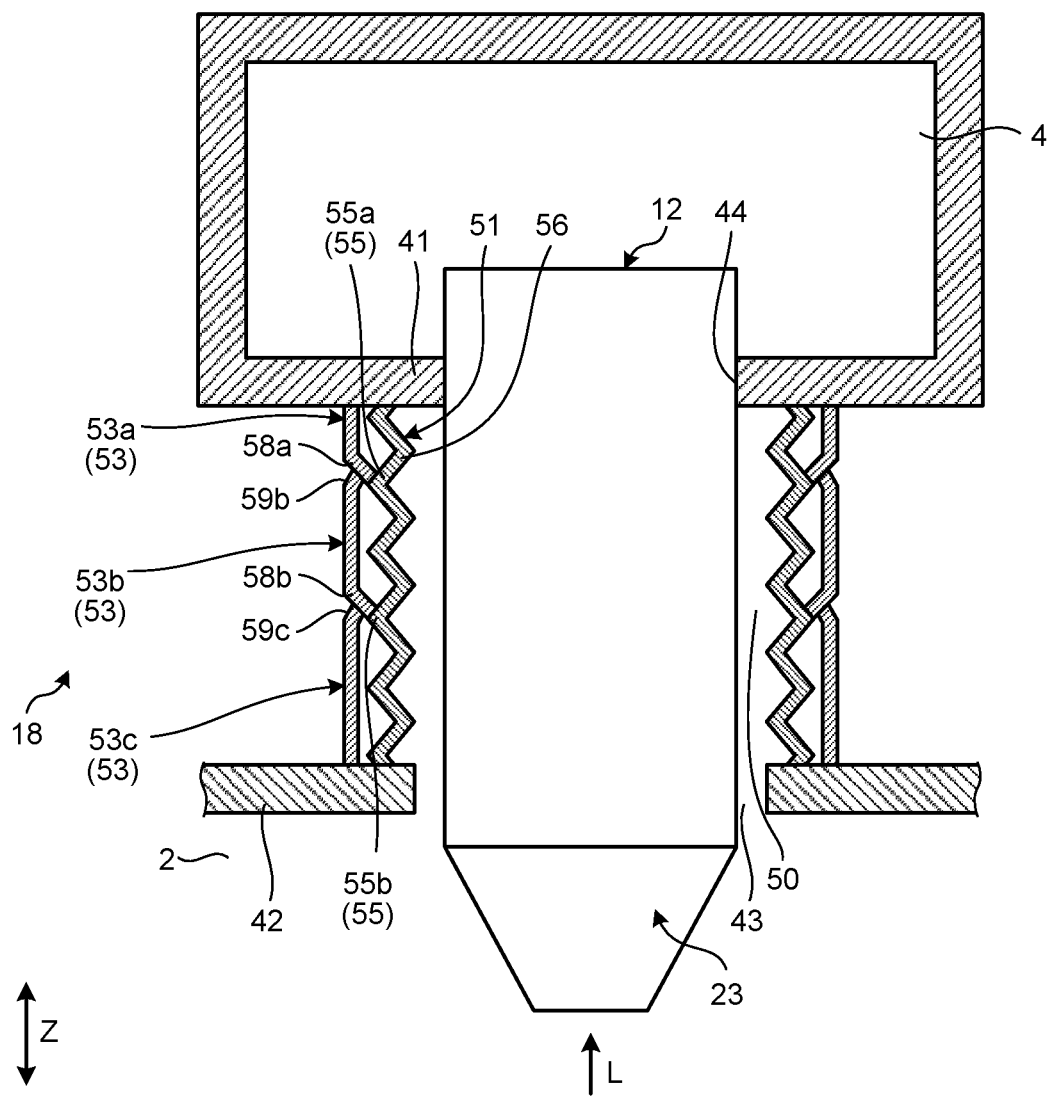
FIG. 2 is a main cross-sectional view taken along a line A-A of a deposition head accommodation chamber illustrated in FIG. 1.
Figure 3:
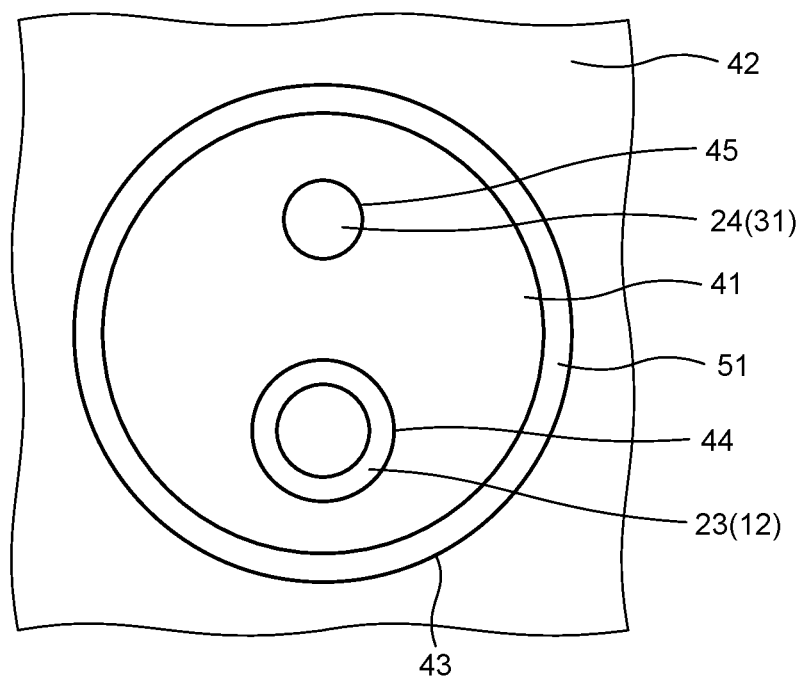
FIG. 3 is a diagram illustrating the deposition head accommodation chamber when viewed from a direction L in FIG. 2.

The deposition head accommodation chamber 4 is provided at an upper face of the three-dimensional deposition chamber 2 in the Z-axis direction. The deposition head accommodation chamber 4 is supported by a Z-axis slide unit 4a to be movable in the Z-axis direction (a direction of an arrow 102) with respect to the three-dimensional deposition chamber 2. FIG. 2 is a main cross-sectional view taken along a line A-A of the deposition head accommodation chamber 4 in FIG. 1. FIG. 3 is a diagram illustrating the deposition head accommodation chamber 4 when viewed from a direction L in FIG. 2. As illustrated in FIG. 2, a lower face 41 of the deposition head accommodation chamber 4 in the Z-axis direction is connected to an opening 43 of an upper face 42 of the three-dimensional deposition chamber 2 in the Z-axis direction by the bellows 18 which is a telescopic unit provided along the outer periphery of the opening 43.

As illustrated in FIGS. 2 and 3, the deposition head accommodation chamber 4 includes openings 44 and 45 which are provided on the face 41 at the inside of the bellows 18 in a radiation direction. The deposition head accommodation chamber 4 supports the deposition head 12, the shape measurement unit 30, and the heating head 31. The deposition head accommodation chamber 4 is formed so that a part including a nozzle 23 of the deposition head 12 protrudes toward the three-dimensional deposition chamber 2 through the opening 44. Further, the deposition head accommodation chamber 4 is formed so that a part including a front end 24 of the heating head 31 protrudes toward the three-dimensional deposition chamber 2 through the opening 45. The opening 44 and the deposition head 12 are fixed. The opening 44 and the deposition head 12 are connected to each other while sealing the three-dimensional deposition chamber 2. The opening 45 and the heating head 31 are fixed. The opening 45 and the deposition head 12 are connected to each other while sealing the three-dimensional deposition chamber 2.

Next, the bellows 18 will be described. The bellows 18 includes a bellows part 51 and a guide part 53. The bellows part 51 is provided along the outer periphery of the opening 43 of the face 42 of the three-dimensional deposition chamber 2. The bellows part 51 extends from the face 42 of the three-dimensional deposition chamber 2 to the face 41 of the deposition head accommodation chamber 4 in the Z-axis direction. The bellows part 51 is formed in a shape in which a protruding part 55 directed outward in the radiation direction and a groove part 56 directed inward in the radiation direction are alternately and repeatedly formed along the Z-axis direction. The bellows part 51 can expand and contract along the Z-axis direction.

The guide part 53 is provided along the outer periphery of the bellows part 51. The guide part 53 has a function of protecting the bellows part 51. The guide part 53 includes sub-guide parts 53a, 53b, and 53c. The sub-guide part 53a extends downward in the Z-axis direction from the face 41 of the deposition head accommodation chamber 4 and is attached to a protruding part 55a of the bellows part 51 at a movable part 58a of a downward front end in the Z-axis direction. The sub-guide part 53b is attached to the movable part 58a of the sub-guide part 53a in the movable part 59b of an upper end in the Z-axis direction and extends downward in the Z-axis direction. The sub-guide part 53b is attached to the protruding part 55b of the bellows part 51 at the movable part 58b of a lower end in the Z-axis direction. Additionally, the protruding part 55b is located below the protruding part 55a in the Z-axis direction. The sub-guide part 53c is attached to the movable part 58b of the sub-guide part 53b at the movable part 59c in an upper end in the Z-axis direction and is attached to the face 42 of the three-dimensional deposition chamber 2 in a lower end in the Z-axis direction.

The movable parts 58a, 58b, 59b, and 59c of the sub-guide parts 53a, 53b, and 53c are respectively deformable. Thus, the sub-guide parts 53a, 53b, and 53c move in a telescopic manner by the telescopic movement of the bellows part 51. Additionally, the guide part 53 is not limited to this structure as long as the guide part is provided at the outer periphery of the bellows part 51 and moves in a telescopic manner by the telescopic movement of the bellows part 51. Further, for example, the bellows 18 may not include the guide part 53 when the bellows part 51 is not needed.

As described above, the openings 44 and 45 of the deposition head accommodation chamber 4 and the deposition head 12 are sealed. Further, the bellows 18 is formed so that the bellows part 51 is provided along the outer periphery of the opening 43 of the face 42 of the three-dimensional deposition chamber 2. Thus, a space 50 which is surrounded by the inner periphery of the bellows part 51 and the face 41 of the deposition head accommodation chamber 4 is connected to the three-dimensional deposition chamber 2 by the opening 43 of the three-dimensional deposition chamber 2. The space 50 is sealed along with the three-dimensional deposition chamber 2.

When the deposition head accommodation chamber 4 moves in the Z-axis direction by the Z-axis slide unit 4a, the deposition head 12, the shape measurement unit 30, and the heating head 31 held therein are moved in the Z-axis direction. Further, since the deposition head accommodation chamber 4 is connected to the three-dimensional deposition chamber 2 through the bellows 18, the bellows 18 expands and contracts in the Z-axis direction in accordance with the movement in the Z-axis direction. At this time, the bellows 18 expands and contracts in the Z-axis direction while sealing the three-dimensional deposition chamber 2. Additionally, the deposition head accommodation chamber 4 may move the deposition head 12, the shape measurement unit 30, and the heating head 31 in the X-axis direction and the Y-axis direction.

Additionally, the shape of the bellows part 51 is not limited to that of the first embodiment as long as the bellows part expands and contracts in the Z-axis direction and the inside of the three-dimensional deposition chamber 2 can be sealed. For example, the bellows part 51 is obtained by connecting a plurality of tubular members having different diameters in an axial direction. Here, a tubular member having a small diameter may be received in a tubular member having a large diameter. For example, a tubular elastic member may be used.

The machining unit accommodation chamber 5 is provided at the upper face of the three-dimensional deposition chamber 2 in the Z-axis direction. Further, the machining unit accommodation chamber 5 is disposed adjacent to the deposition head accommodation chamber 4. The machining unit accommodation chamber 5 is supported by a Z-axis slide unit 5a to be movable in the Z-axis direction (a direction of an arrow 104) with respect to the three-dimensional deposition chamber 2. A lower face of the machining unit accommodation chamber 5 in the Z-axis direction is connected to the three-dimensional deposition chamber 2 by the bellows 19. The bellows 19 connects the lower face of the machining unit accommodation chamber 5 in the Z-axis direction to the three-dimensional deposition chamber 2 so that the lower face of the machining unit accommodation chamber 5 in the Z-axis direction is formed as a part of the three-dimensional deposition chamber 2. Further, the three-dimensional deposition chamber 2 is formed so that an opening is formed in an area surrounded by the bellows 19. A space surrounded by the lower face of the machining unit accommodation chamber 5 in the Z-axis direction and the bellows 19 is connected to the three-dimensional deposition chamber 2 and is sealed along with the three-dimensional deposition chamber 2. The machining unit accommodation chamber 5 supports the machining unit 13. Further, the machining unit accommodation chamber 5 is formed so that a part including a tool 22 of the machining unit 13 protrudes toward the three-dimensional deposition chamber 2 from the lower face in the Z-axis direction. Additionally, since the bellows 19 has the same structure as that of the bellows 18, a description thereof will be omitted.

When the machining unit accommodation chamber 5 moves in the Z-axis direction by the Z-axis slide unit 5a, the machining unit 13 held therein is moved in the Z-axis direction. Further, since the machining unit accommodation chamber 5 is connected to the three-dimensional deposition chamber 2 through the bellows 19, the bellows 19 expands and contracts in the Z-axis direction by the movement in the Z-axis direction. At this time, the bellows 19 expands and contracts in the Z-axis direction while sealing the three-dimensional deposition chamber 2. Additionally, the machining unit accommodation chamber 5 may move the machining unit 13 in the X-axis direction and the Y-axis direction.

The bed 10 is provided at a bottom in the three-dimensional deposition chamber 2 in the Z-axis direction. The bed 10 supports the table unit 11. Various wirings, pipes, or driving assemblies are disposed on the bed 10.

The table unit 11 is disposed on an upper face of the bed 10 and supports the base unit 100. The table unit 11 includes a Y-axis slide unit 15, an X-axis slide unit 16, and a rotation table unit 17. The table unit 11 has the base unit 100 attached thereto and moves the base unit 100 on the bed 10.

The Y-axis slide unit 15 moves the X-axis slide unit 16 in the Y-axis direction (a direction of an arrow 106) with respect to the bed 10. The X-axis slide unit 16 is fixed to a member corresponding to a movable part of the Y-axis slide unit 15. The X-axis slide unit 16 moves the rotation table unit 17 in the X-axis direction (a direction of an arrow 108) with respect to the Y-axis slide unit 15. The rotation table unit 17 is fixed to a member corresponding to a movable part of the X-axis slide unit 16 and supports the base unit 100. The rotation table unit 17 is, for example, an inclined circular table and includes a fixing base 17a, a rotation table 17b, an inclination table 17c, and a rotation table 17d. The fixing base 17a is fixed to a member corresponding to a movable part of the X-axis slide unit 16. The rotation table 17b is supported by the fixing base 17a. The rotation table 17b rotates about a rotation shaft 110 which is a rotation axis and is parallel to the Z-axis direction. The inclination table 17c is supported by the rotation table 17b. The inclination table 17c rotates about a rotation shaft 112 which is an axis and is orthogonal to a face supporting the rotation table 17b. The rotation table 17d is supported by the inclination table 17c. The rotation table 17d rotates about a rotation shaft 114 which is an axis and is orthogonal to a surface supporting the inclination table 17c. The rotation table 17d is used to fix the base unit 100. In this way, the rotation table unit 17 can rotate the base unit 100 about three orthogonal axes by rotating the components thereof about the rotation shafts 110, 112, and 114. The table unit 11 moves the base unit 100 fixed to the rotation table unit 17 in the Y-axis direction and the X-axis direction by the Y-axis slide unit 15 and the X-axis slide unit 16. Further, the table unit 11 rotates the base unit 100 about three orthogonal axes by rotating the components thereof about the rotation shafts 110, 112, and 114 by the rotation table unit 17. The table unit 11 may further move the base unit 100 in the Z-axis direction.

The deposition head 12 injects a powder material toward the base unit 100, irradiates the powder material injected onto the base unit with a laser beam to melt the powder, and solidifies the melted powder on the base unit 100 to form a formed layer. The powder which is introduced into the deposition head 12 is powder which is used as a raw material of the three-dimensional object. In the first embodiment, for example, a metal material such as iron, copper, aluminum, or titanium can be used as the powder. As the powder, a material such as ceramic other than the metal material may be used. The deposition head 12 is provided at a position facing the upper face of the bed 10 in the Z-axis direction and faces the table unit 11. A lower part of the deposition head 12 in the Z-axis direction is provided with the nozzle 23. The nozzle 23 is attached to a main body 66 of the deposition head 12.

Figure 4:
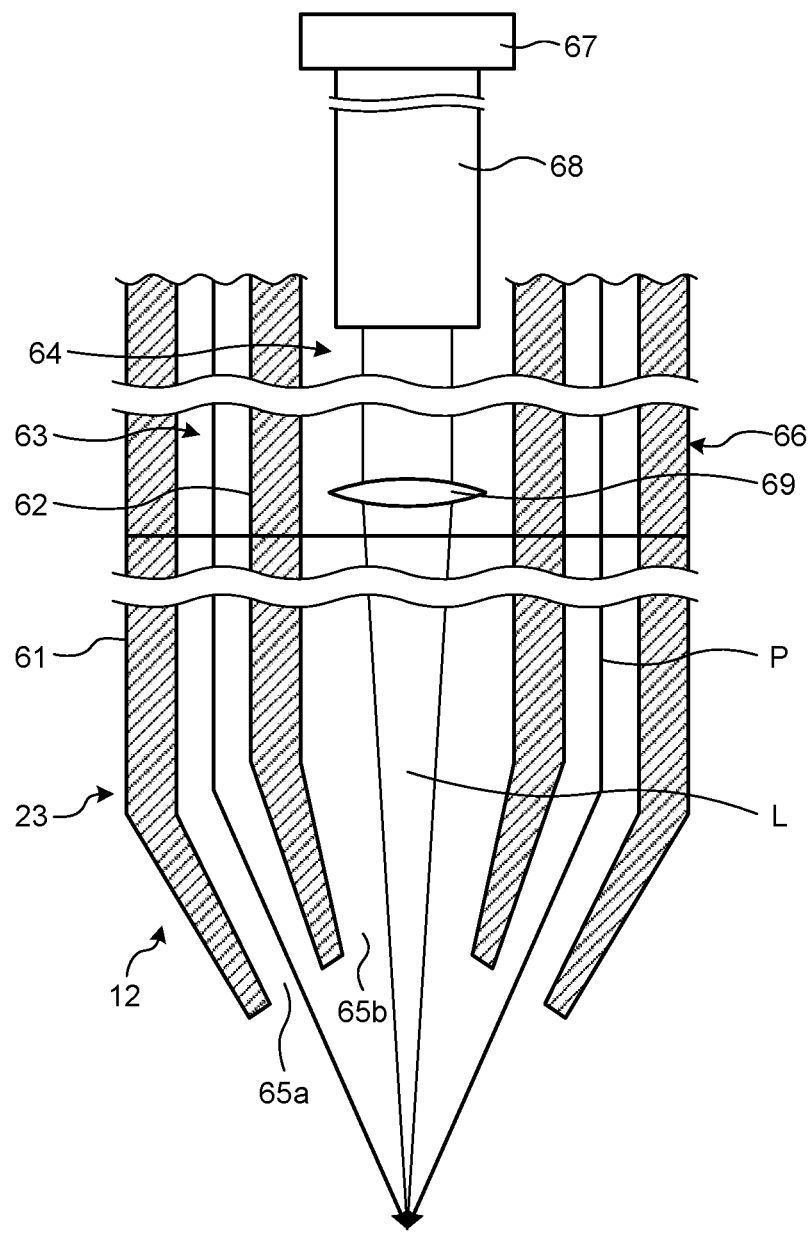
FIG. 4 is a cross-sectional view illustrating an example of a nozzle of a deposition head.

FIG. 4 is a cross-sectional view illustrating an example of the nozzle 23 of the deposition head 12. As illustrated in FIG. 4, the nozzle 23 is a double tube which includes an outer tube 61 and an inner tube 62 inserted into the outer tube 61. The outer tube 61 is a tubular member and is formed so that a diameter decreases toward a front end (downward in the Z-axis direction). The inner tube 62 is inserted into the outer tube 61. The inner tube 62 is also a tubular member and has a shape in which a diameter decreases toward a front end (downward in the Z-axis direction). A powder passage 63 through which a powder material (powder) P passes is formed between the inner periphery of the outer tube 61 and the outer periphery of the inner tube 62. A laser path 64 through which a laser beam passes is formed at an inner peripheral face side of the inner tube 62. Here, the main body 66 to which the nozzle 23 is attached is a double tube similarly to the nozzle 23 and the powder passage 63 and the laser path 64 are also formed in this way. In the deposition head 12, the powder passage 63 is disposed to surround the periphery of the laser path 64. In the first embodiment, the powder passage 63 is configured as a powder injection unit that injects the powder. In the deposition head 12, the powder P which is introduced from the powder introduction unit 35 flows in the powder passage 63 and is injected from a powder injection opening 65a which is a front end opening between the outer tube 61 and the inner tube 62.

Further, in the first embodiment, the laser path 64 is configured as a light irradiation unit. The laser path 64 of the deposition head 12 is provided with a light source 67, an optical fiber 68, and a light concentrating unit 69. The light source 67 outputs a laser beam. The optical fiber 68 guides a laser output from the light source 67 to the laser path 64. The light concentrating unit 69 is disposed in the laser path 64 and is disposed in an optical path of the laser output from the optical fiber 68. The light concentrating unit 69 concentrates a laser beam L output from the optical fiber 68. The laser beam L which is collected by the light concentrating unit 69 is output from a laser irradiation opening 65b which is a front end opening of the inner tube 62. In the deposition head 12, the light concentrating unit 69 is disposed in the main body 66, but a part or the entirety of the light concentrating unit 69 may be disposed in the nozzle 23. When a part or the entirety of the light concentrating unit 69 is disposed in the nozzle 23, a focal position can be changed to a different position by the exchange of the nozzle 23.

The deposition head 12 injects the powder P from the powder passage 63 and outputs the laser beam L from the laser path 64. The powder P injected from the deposition head 12 enters an area irradiated with the laser beam L output from the deposition head 12 and is heated by the laser beam L. The powder P irradiated with the laser beam L is melted and reaches the base unit 100. The powder P which reaches the base unit 100 in a melted state is cooled and solidified. Accordingly, a formed layer is formed on the base unit 100.

Here, the deposition head 12 of the first embodiment may not include an optical fiber which guides the laser beam L output from the light source 67 to the optical fiber 68. Further, the light concentrating unit 69 may be provided at one of or both the main body 66 and the nozzle 23. Since the deposition head 12 of the first embodiment can be processed effectively, the powder passage 63 ejecting the powder P and the laser path 64 irradiated with the laser beam L are provided coaxially, but the invention is not limited thereto. The deposition head 12 may be formed so that an assembly for injecting the powder P and an assembly for emitting the laser beam L are provided as separate members. The deposition head 12 of the first embodiment irradiates a powder material with a laser beam L, but may emit a light beam other than the laser beam as long as the powder material can be melted or sintered.

The machining unit 13 is used to machine, for example, a formed layer or the like. As illustrated in FIG. 1, the machining unit 13 is provided at a position facing the upper face of the bed 10 in the Z-axis direction and faces the table unit 11. The tool 22 is attached to a lower end of the machining unit 13 in the Z-axis direction. Additionally, the machining unit 13 may be provided in the movable range of the base unit 100 using the table unit 11 above the bed 10 in the Z-axis direction. Here, the arrangement position is not limited to the position of the first embodiment.

Figure 5:
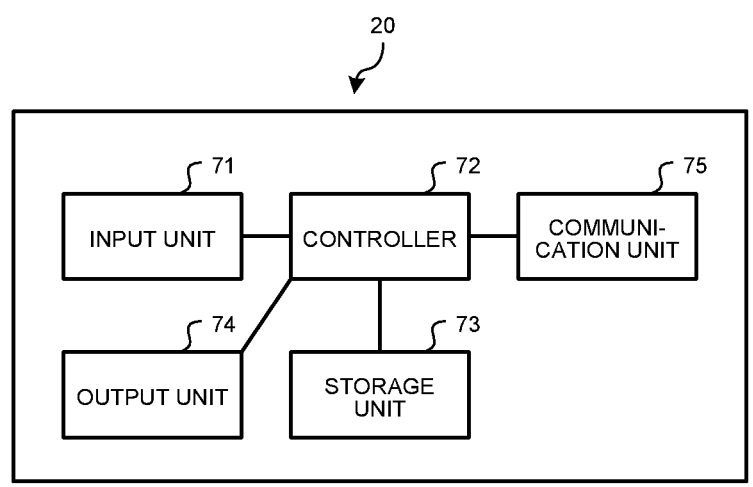
FIG. 5 is a schematic diagram illustrating a configuration of a control device.

FIG. 5 is a schematic diagram illustrating a configuration of the control device 20. The control device 20 is electrically connected to the components of the three-dimensional deposition device 1 and controls the operations of the components of the three-dimensional deposition device 1. The control device 20 is provided at the outside of the three-dimensional deposition chamber 2 or the spare chamber 3. The control device 20 includes, as illustrated in FIG. 5, an input unit 71, a controller 72, a storage unit 73, an output unit 74, and a communication unit 75. The components of the input unit 71, the controller 72, the storage unit 73, the output unit 74, and the communication unit 75 are electrically connected to one another.

The input unit 71 is, for example, an operation panel. An operator inputs information or an instruction to the input unit 71. The controller 72 includes, for example, a CPU (Central Processing Unit) and a memory. The controller 72 outputs an instruction for controlling the operations of the components of the three-dimensional deposition device 1 to the components of the three-dimensional deposition device 1. Further, information is input to the controller 72 from the components of the three-dimensional deposition device 1. The storage unit 73 is, for example, a storage device such as a RAM (Random Access Memory) or a ROM (Read Only Memory). The storage unit 73 stores an operation program for the three-dimensional deposition device 1 controlling the operations of the components by the controller 72 executing the program, information of the three-dimensional deposition device 1, or design information of the three-dimensional object. The output unit 74 is, for example, a display. The output unit 74 displays, for example, information of the components of the three-dimensional deposition device 1. The communication unit 75 exchanges information with, for example, a communication line such as the Internet or a LAN (Local Area Network) by communicating with the communication line. Additionally, the control device 20 may include at least the controller 72 and the storage unit 73. The control device 20 may output an instruction to the components of the three-dimensional deposition device 1 if the controller 72 and the storage unit 73 are provided.

The shape measurement unit 30 is fixed to the deposition head accommodation chamber 4. The shape measurement unit 30 is disposed adjacent to the deposition head 12. The shape measurement unit 30 measures a surface shape of the formed layer formed on the base unit 100. As the shape measurement unit 30, for example, a 3D scanner or a device measuring a relative distance can be used. For example, the shape measurement unit 30 performs scanning the surface of the formed layer on the base unit 100 by a laser beam to calculate position information of the surface of the formed layer from reflected light. The shape measurement unit then measures the surface shape of the formed layer. Further, in the first embodiment, the shape measurement unit 30 is attached to the deposition head accommodation chamber 4. However, the shape measurement unit 30 may be attached to a different position as long as the surface shape of the formed layer formed on the base unit 100 can be measured.

The heating head 31 heats the formed layer or the melted powder P on the base unit 100. The heating head 31 is fixed to the deposition head accommodation chamber 4. The heating head 31 is disposed adjacent to the deposition head 12. For example, the heating head 31 irradiates the formed layer or the melted powder P with a laser beam, infrared light, or an electromagnetic wave so that the formed layer or the melted powder is heated. When the formed layer or the melted powder P is heated by the heating head 31, a temperature of the formed layer or the melted powder P can be controlled. Accordingly, it is possible to suppress an abrupt decrease in temperature of the formed layer or the melted powder P or to form an atmosphere (a high-temperature environment) in which the powder P is easily melted. Additionally, the heating head 31 may further include, for example, a temperature sensor that measures a temperature of the surface of the formed layer. The heating head 3 may control the heating based on a measurement result of the temperature sensor.

The machining measurement unit 32 measures a position of the front end of the tool 22 of the machining unit 13. The machining measurement unit 32 measures the position of the front end of the tool 22 of the machining unit 13 by capturing an image of the front end. Thus, the machining measurement unit 32 can measure the position of the front end of the tool 22 while the machining unit 13 is operated. However, the machining measurement unit 32 is not limited to the image capturing type. For example, the position of the front end of the tool 22 of the machining unit 13 may be measured by a laser beam.

The tool exchange unit 33 is disposed inside the three-dimensional deposition chamber 2. The tool exchange unit 33 exchanges the tool 22 attached to the machining unit 13. The tool exchange unit 33 moves a part which does not hold the tool 22 to a position facing the machining unit 13. That is, the tool exchange unit 33 moves a part which does not grip the tool 22 to a position facing the machining unit 13.

Subsequently, the tool exchange unit separates the tool 22 attached to the machining unit 13. Then, the tool exchange unit moves a part which grips a different tool 22 to be attached to the machining unit 13 to a position facing the machining unit 13 and attaches the different tool 22 to the machining unit 13. In this way, the tool exchange unit 33 can exchange the tool 22 of the machining unit 13 by attaching or separating the tool 22 of the machining unit 13. Additionally, the tool exchange unit 33 is not limited to this configuration as long as the tool 22 of the machining unit 13 can be exchanged.

The nozzle exchange unit 34 is disposed inside the three-dimensional deposition chamber 2. The nozzle exchange unit 34 exchanges the nozzle 23 attached to the deposition head 12. The nozzle exchange unit 34 can use the same structure as that of the tool exchange unit 33.

Figure 6A:
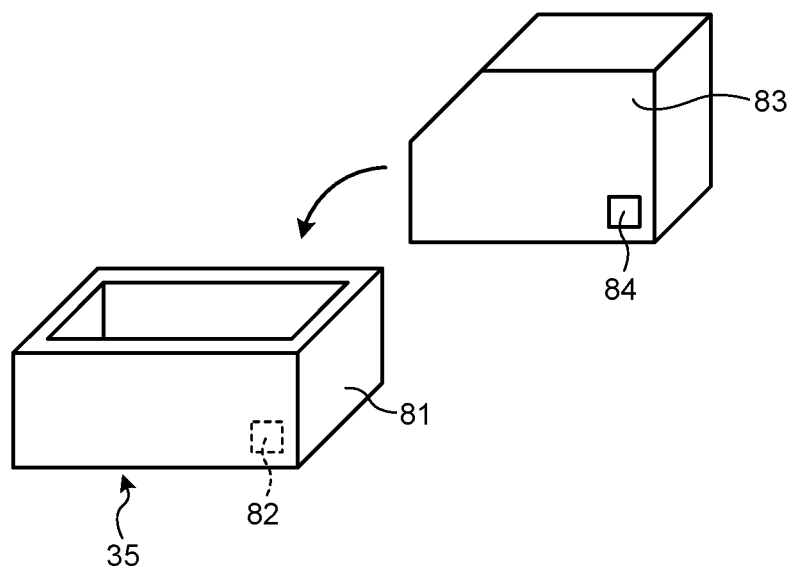
FIG. 6A is a schematic diagram illustrating an example of a powder introduction unit.
Figure 6B:
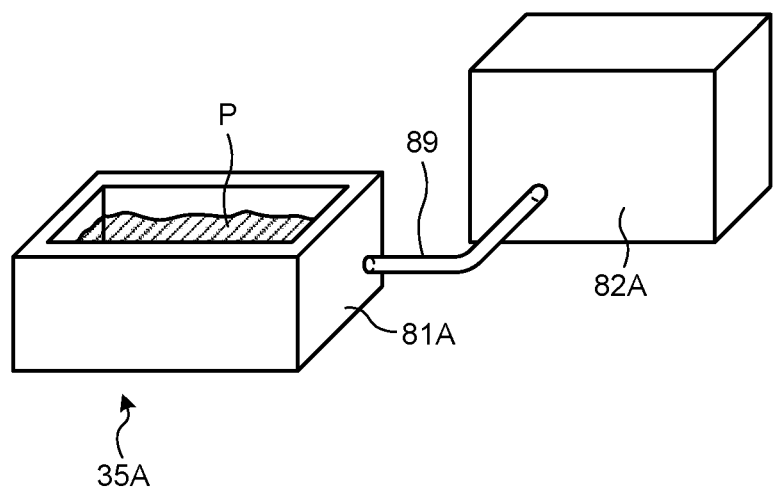
FIG. 6B is a schematic diagram illustrating an example of the powder introduction unit.

The powder introduction unit 35 introduces a powder material which becomes a raw material of a three-dimensional object to the deposition head 12. FIGS. 6A and 6B are schematic diagrams illustrating examples of the powder introduction unit. As illustrated in FIG. 6A, in the first embodiment, the powder P is managed while being enclosed in a cartridge 83. That is, the powder is shipped while being enclosed in the cartridge 83 in accordance with, for example, the type of material. The cartridge 83 is provided with a material display part 84. The material display part 84 is, for example, a display which indicates powder information such as a material type. The material display part 84 is not limited to information which can be checked by eyes and may be an IC chip or a two-dimensional code or mark. This information can be acquired by a reader. The material display part 84 is not limited thereto as long as the type of powder can be displayed. The material display part 84 can indicate, for example, powder information necessary for manufacturing the three-dimensional object such as a particle size, a weight, purity of powder or an oxide coating of powder other than the type of powder. Further, the material display part 84 may include information which indicates whether the powder is a regular product.

The powder introduction unit 35 includes a POWDER STORAGE unit 81 and a POWDER IDENTIFICATION unit 82. The powder storage unit 81 is, for example, a box-shaped member and accommodates the cartridge 83 therein. The powder storage unit 81 is connected to a carrying air supply part which carries out the powder or a carrying path through which the powder is carried to the deposition head 12. The powder storage unit 81 introduces the powder stored in the cartridge 83 into the deposition head 12 when the cartridge 83 is accommodated therein. When the powder identification unit 82 detects a state where the cartridge 83 is accommodated in the powder storage unit 81, the material display part 84 of the cartridge 83 is read so that the information of the powder stored in the cartridge 83 is read. The powder introduction unit 35 can supply known powder to the deposition head 12 by acquiring the powder information by the powder identification unit 82.

Here, the powder introduction unit 35 may supply a powder which is not managed while being enclosed in the cartridge 83 to the deposition head 12. FIG. 6B illustrates a powder introduction unit 35A in which the powder is not enclosed in the cartridge. The powder introduction unit 35A includes a powder storage unit 81A, a powder identification unit 82A, and a powder guide tube 89 which connects the powder storage unit 81A and the powder identification unit 82A to each other. The powder storage unit 81A is, for example, a box-shaped member and stores the powder P therein. The powder identification unit 82A analyzes the powder supplied through the powder guide tube 89 and measures the powder information necessary for manufacturing the three-dimensional object such as a particle size, a weight, purity of powder or an oxide coating of powder. As the powder identification unit 82A, a spectral analysis device which identifies a powder material by a spectral analysis, a particle size analysis device which measures a powder particle size by a particle size analysis, and a weight measurement device which measures a powder weight can be used. The powder identification unit 82A measures powder purity from, for example, the type, the particle size, and the weight of the powder measured as described above. Further, the powder identification unit 82A measures the oxide coating of the powder by, for example, conductivity. The powder introduction unit 35A also can supply known powder to the deposition head 12 by acquiring the powder information by the powder identification unit 82A.

The base movement unit 36 is disposed in the spare chamber 3. The base movement unit 36 moves a base unit 100a from the inside of the spare chamber 3 into the three-dimensional deposition chamber 2 and moves the base unit 100 inside the three-dimensional deposition chamber 2 into the spare chamber 3. The base unit 100a which is carried into the spare chamber 3 from the outside is attached to the base movement unit 36. The base movement unit 36 carries the base unit 100a attached thereto from the spare chamber 3 into the three-dimensional deposition chamber 2. More specifically, the base movement unit 36 moves the base unit 100a attached to the base movement unit 36 into the three-dimensional deposition chamber 2 so that the base unit is attached to the rotation table unit 17. The base movement unit 36 moves the base unit 100 by, for example, a robot arm or an orthogonal carrying device.

The gas discharge unit 37 is, for example, a vacuum pump and discharges air inside the three-dimensional deposition chamber 2. The gas introduction unit 38 introduces a gas having a predetermined element, for example, an inert gas such as argon and nitrogen into the three-dimensional deposition chamber 2. The three-dimensional deposition device 1 discharges the air of the three-dimensional deposition chamber 2 by the gas discharge unit 37 and introduces a gas having a predetermined element, for example, an inert gas such as argon and nitrogen into the three-dimensional deposition chamber 2 by the gas introduction unit 38. Accordingly, the three-dimensional deposition device 1 can form a desired gas atmosphere in the three-dimensional deposition chamber 2. Here, in the first embodiment, the gas introduction unit 38 is provided below the gas discharge unit 37 in the Z-axis direction. When the three-dimensional deposition device 1 uses argon having a specific weight higher than that of a gas such as oxygen in air as an introduction gas while the gas introduction unit 38 is provided below the gas discharge unit 37 in the Z-axis direction, an argon gas can be appropriately charged into the three-dimensional deposition chamber 2. Additionally, when the introduction gas is set as a gas lighter than air, a pipe may be disposed in an opposite way. Further, the gas discharge unit 37 may discharge a gas other than the air in the three-dimensional deposition chamber 2.

The powder collection unit 39 collects the powder P which is injected from the nozzle injection opening 45 of the deposition head 12 and is not used to form a formed layer. The powder collection unit 39 suctions the gas inside the three-dimensional deposition chamber 2 and collects the powder P included in the gas. The powder P which is injected from the deposition head 12 is melted and solidified by the laser beam L so that a formed layer is formed.

However, since a part of the powder P is not irradiated with, for example, the laser beam L, there is a case where the powder is left inside the three-dimensional deposition chamber 2. Further, chips which are cut by the machining unit 13 and are discharged from the formed layer are left in the three-dimensional deposition chamber 2. The powder collection unit 39 collects the powder P or chips left in the three-dimensional deposition chamber 2. The powder collection unit 39 may include an assembly such as a brush which mechanically collects the powder.

Figure 7:
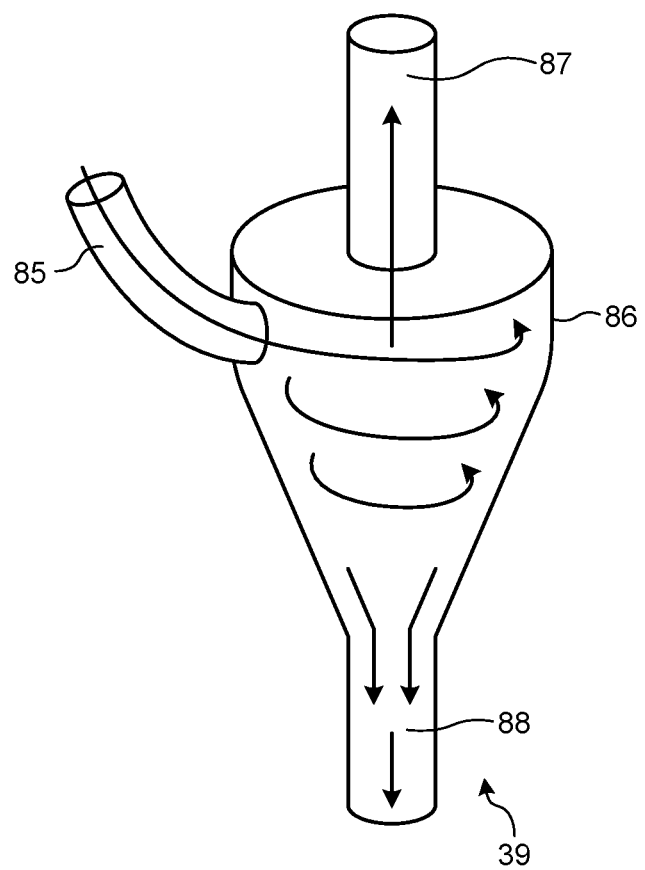
FIG. 7 is a schematic diagram illustrating an example of a powder collection unit.

FIG. 7 is a schematic diagram illustrating an example of the powder collection unit 39. As illustrated in FIG. 7, the powder collection unit 39 includes an introduction part 85, a cyclone part 86, a gas discharge part 87, and a powder discharge part 88. The introduction part 85 is, for example, a tubular member and one end thereof is connected to, for example, the inside of the three-dimensional deposition chamber 2. The cyclone part 86 is, for example, a hollow truncated conical member and is formed so that a diameter decreases as it goes downward in, for example, the vertical direction. The other end of the introduction part 85 is connected to the cyclone part 86 in a tangential direction of an outer periphery of the cyclone part 86. The gas discharge part 87 is a tubular member and one end thereof is connected to an upper end of the cyclone part 86 in the vertical direction. The powder discharge part 88 is a tubular member and one end thereof is connected to a lower end of the cyclone part 86 in the vertical direction.

For example, a pump which suctions a gas is connected to the other end of the gas discharge part 87. Thus, the gas discharge part 87 suctions a gas from the cyclone part 86 to form a negative pressure in the cyclone part 86. Since the cyclone part 86 has a negative pressure, the introduction part 85 suctions a gas from the three-dimensional deposition chamber 2. The introduction part 85 suctions the powder P which is not used to form the formed layer along with the gas inside the three-dimensional deposition chamber 2. The introduction part 85 is connected to the cyclone part 86 in the tangential direction of the outer periphery of the cyclone part 86. Thus, the gas and the powder P which are suctioned to the introduction part 85 turn along an inner periphery of the cyclone part 86. Since the powder P has a specific weight higher than that of the gas, the powder is centrifugally separated outward in a radiation direction at the inner periphery of the cyclone part 86. The powder P is directed toward the lower powder discharge part 88 in an extension direction by the own weight and is discharged from the powder discharge part 88. Further, the gas is discharged by the gas discharge part 87.

The powder collection unit 39 collects the powder P which is not used to form the formed layer in this way. Further, the powder collection unit 39 of the embodiment may separately collect the powder P in accordance with each specific weight. For example, since the powder having a low specific weight has a small weight, the powder is not directed toward the powder discharge part 88 and is suctioned to the gas discharge part 87. Thus, the powder collection unit 39 can separately collect the powder P in accordance with the specific weight. Additionally, the powder collection unit 39 is not limited to such a configuration as long as the powder P which is not used to form the formed layer can be collected.

Figure 8:
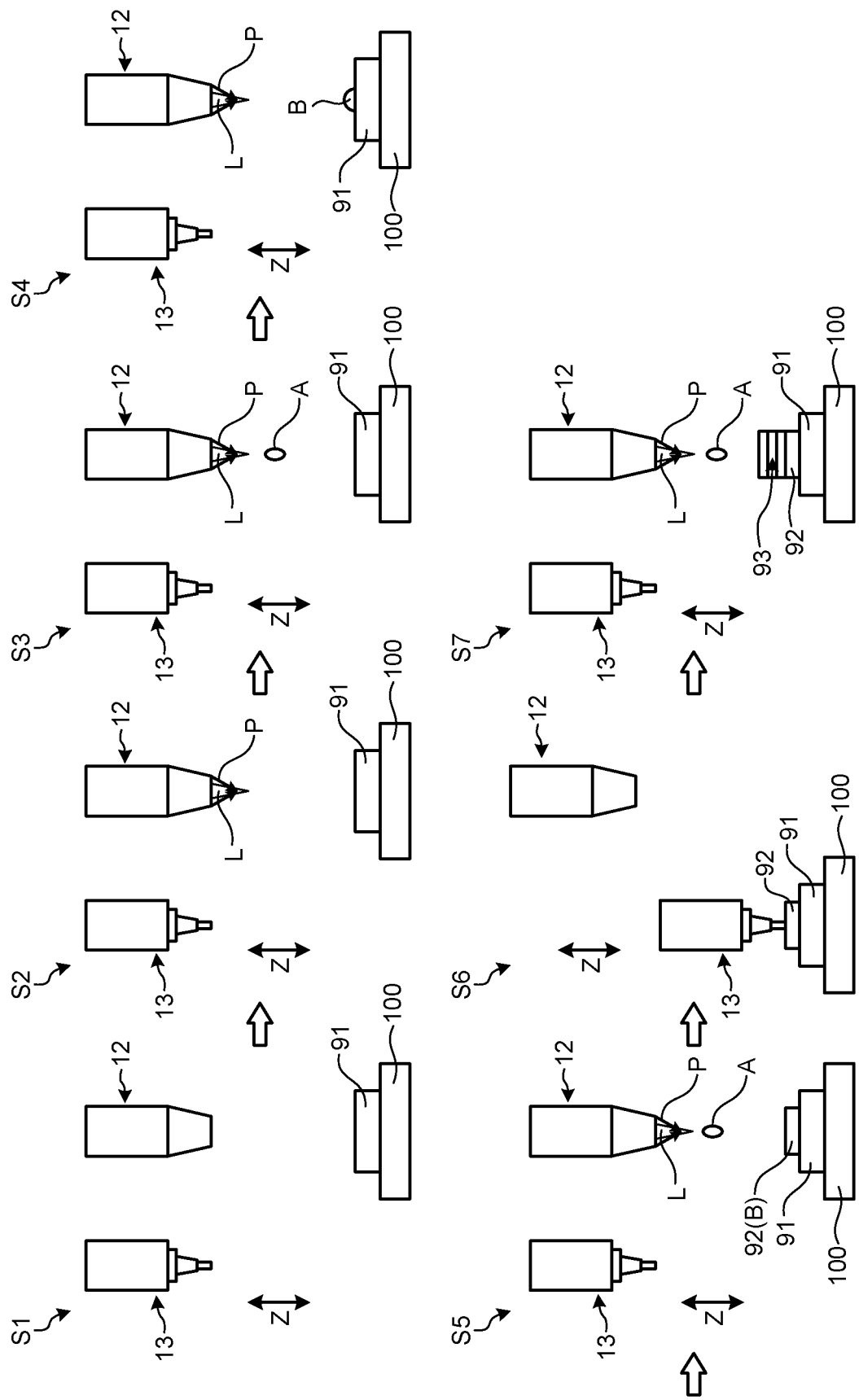
FIG. 8 is a schematic diagram illustrating a three-dimensional object manufacturing method by the three-dimensional deposition device according to the first embodiment.

Next, a three-dimensional object manufacturing method using the three-dimensional deposition device 1 will be described. FIG. 8 is a schematic diagram illustrating the three-dimensional object manufacturing method by the three-dimensional deposition device 1 according to the embodiment. The manufacturing method illustrated in FIG. 8 can be performed by the control to the operations of the components of the control device 20. In the embodiment, a case will be described in which a three-dimensional object is manufactured on a pedestal 91. The pedestal 91 is, for example, a metallic plate-shaped member, but the shape and the material thereof may be arbitrarily set as long as the three-dimensional object is formed thereon. The pedestal 91 is attached on the base unit 100. The base unit 100 is fixed to the rotation table unit 17 of the table unit 11 along with the pedestal 91. Additionally, the pedestal 91 can be set as the base unit 100.

As illustrated in step S1, the control device 20 moves the base unit 100 so that the pedestal 91 of the base unit 100 is disposed below the deposition head 12 in the Z-axis direction by the table unit 11.

Next, as illustrated in step S2, the control device 20 introduces the powder from the powder introduction unit 35 into the deposition head 12 and emits the laser beam L while injecting the powder P from the deposition head 12 along with the gas. The powder P has a predetermined convergence diameter and is injected toward the pedestal 91 of the base unit 100. The laser beam L is emitted to the powder P with a predetermined spot diameter between the deposition head 12 and the pedestal 91. Here, the position of the spot diameter of the laser beam L in the Z-axis direction with respect to the position of the convergence diameter of the powder P in the Z-axis direction and the spot diameter at the position of the convergence diameter of the powder P in the Z-axis direction can be controlled by, for example, the movement of the position of the light concentrating unit 49.

As illustrated in step S3, the control device 20 injects the powder P from the deposition head 12 while emitting the laser beam L so that the powder P is melted by the irradiation with the laser beam L. The melted powder P which is a molten body A falls downward in the Z-axis direction toward the pedestal 91 of the base unit 100.

The molten body A which falls downward in the Z-axis direction reaches a predetermined position of the pedestal 91 of the base unit 100. The molten body A on the pedestal 91 is cooled at a predetermined position on the pedestal 91 by, for example, heat radiation. As illustrated in step S4, the cooled molten body A is solidified as a solid body B on the pedestal 91.

The control device 20 forms the solid body B on the base unit 100 by the deposition head 12 according to a sequence from step S2 to step S4 while moving the base unit 100 to a predetermined position by the table unit 11. When these sequences are repeated, as illustrated in step S5, the solid body B forms a formed layer 92 having a predetermined shape on the pedestal 91.

As illustrated in step S6, the control device 20 moves the pedestal 91 of the base unit 100 by the table unit 11 so that the formed layer 92 formed on the pedestal 91 is disposed below the machining unit 13 in the Z-axis direction. Further, the control device 20 performs a machining operation on the formed layer 92 by the machining unit 13. The control device 20 determines whether to perform a machining operation by the machining unit 13. If this machining operation is not necessary, the machining operation may not be performed. Thus, there is a case where the machining operation illustrated in step S6 is not performed in accordance with the instruction of the control device 20.

Next, as illustrated in step S7, the control device 20 moves the pedestal 91 of the base unit 100 by the table unit 11 so that the formed layer 92 formed on the pedestal 91 is disposed below the deposition head 12 in the Z-axis direction. Then, the sequence from step S2 to step S6 is repeated so that a formed layer 93 is sequentially deposited on the formed layer 92 and thus the three-dimensional object is manufactured.

From the description above, the three-dimensional deposition device 1 according to the first embodiment manufactures the three-dimensional object as below. The powder injection unit 43 of the deposition head 12 injects the powder P toward the pedestal 91 of the base unit 100. Further, the powder passage 63 of the deposition head 12 irradiates the powder P provided between the deposition head 12 and the pedestal 91 with the laser beam L. The powder P which is irradiated with the laser beam L is melted and solidified on the pedestal 91 of the base unit 100 and thus the formed layer 92 is formed. The three-dimensional deposition device 1 sequentially deposited the formed layer 93 on the formed layer 92 and performs an appropriate machining operation on the formed layers 92 and 93 by the machining unit 13 to manufacture the three-dimensional object.

In the first embodiment, the three-dimensional object is manufactured on the pedestal 91, but the three-dimensional object may not be manufactured on the pedestal 91. The three-dimensional object may be directly manufactured on, for example, the base unit 100. Further, the three-dimensional deposition device 1 may perform so-called overlay welding by depositing a formed layer on an existing shaped material.

Figure 9:
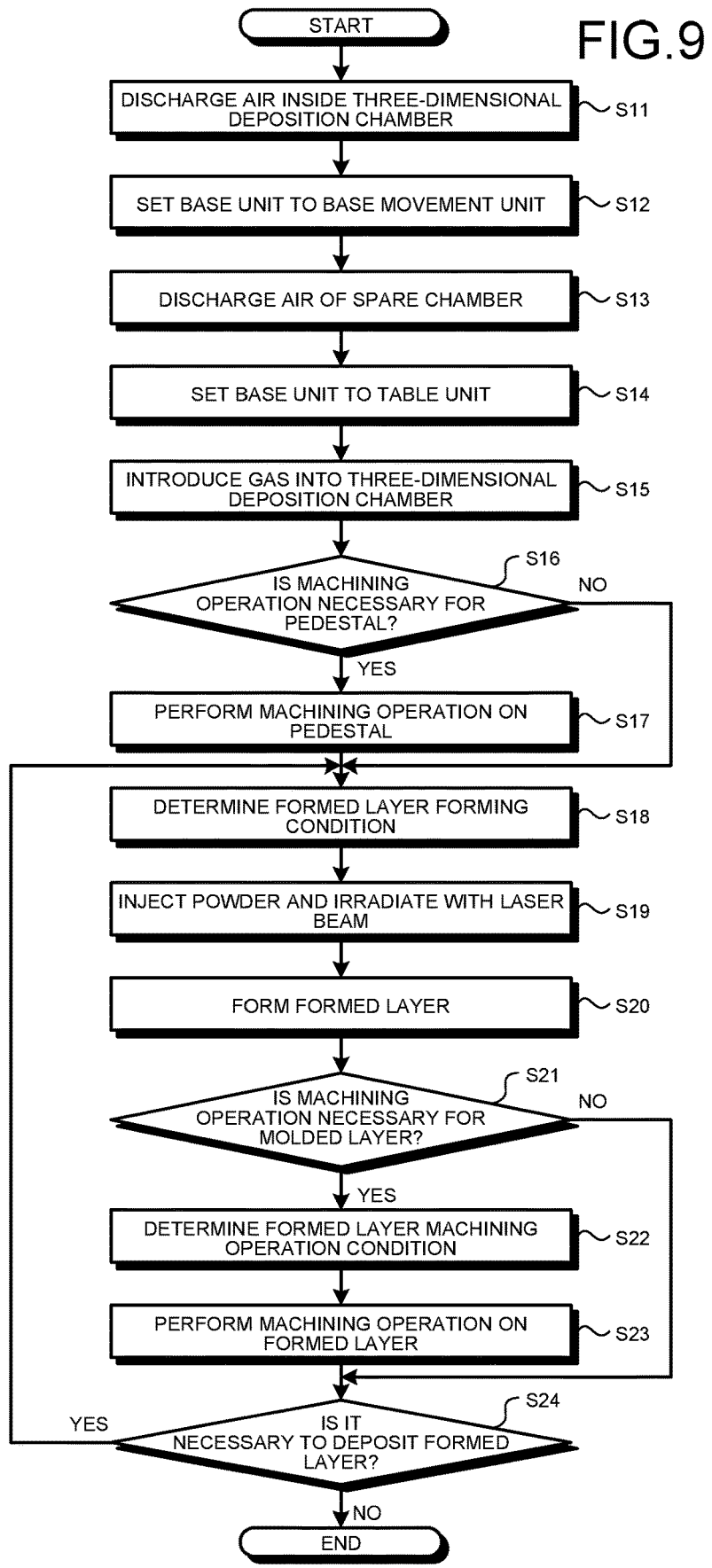
FIG. 9 is a flowchart illustrating a step of manufacturing the three-dimensional object by the three-dimensional deposition device according to the first embodiment.

Next, a detailed process of manufacturing the three-dimensional object by the three-dimensional deposition device 1 according to the first embodiment will be described. FIG. 9 is a flowchart illustrating a step of manufacturing the three-dimensional object by the three-dimensional deposition device 1 according to the first embodiment. The control device 20 reads, for example, the three-dimensional object design information stored in the storage unit 73.

Next, the control device 20 discharges air in the three-dimensional deposition chamber 2 by the air discharge unit 37 (step S11). Here, the three-dimensional deposition chamber 2 is separated from the spare chamber 3 while the door 6 is closed. Further, in the three-dimensional deposition chamber 2, a part which communicates with the other external air is also closed and sealed. For example, the control device 20 discharges air from the gas discharge unit 37 so that an oxygen concentration in the three-dimensional deposition chamber 2 is 100 ppm or less and desirably 10 ppm or less. The control device 20 can set an inert state by changing the oxygen concentration inside the three-dimensional deposition chamber 2 to 100 ppm or less and further reliably set an inert state by changing the oxygen concentration to 10 ppm or less.

Next, the base unit 100 with the pedestal 91 is attached to the base movement unit 36 inside the spare chamber 3 (step S12). Additionally, the three-dimensional deposition device 1 may perform a process in step S12 prior to a process in step S11.

After the base movement unit 36 inside the spare chamber 3 is attached, the control device 20 closes the door 7 of the spare chamber 3 and discharges air in the spare chamber 3 by the spare chamber gas discharge unit 25 (step S13). The control device 20 decreases an oxygen concentration in the spare chamber 3 by discharging the air through the spare chamber gas discharge unit 25. It is desirable that the oxygen concentration in the spare chamber 3 be equal to, for example, the oxygen concentration in the three-dimensional deposition chamber 2.

When the air of the spare chamber 3 is completely discharged, the control device 20 opens the door 6 of the three-dimensional deposition chamber 2 and attaches the base unit 100 to the rotation table unit 17 inside the three-dimensional deposition chamber 2 by the base movement unit 36 (step S14). The base unit 100 is fixed to the rotation table unit 17. After the base unit 100 is attached to the rotation table unit 17, the control device 20 returns the base movement unit 36 into the spare chamber 3 and closes the door 6.

When the base unit 100 is set to the rotation table unit 17, the control device 20 introduces a gas into the three-dimensional deposition chamber 2 by the gas introduction unit 38 (step S15). The control device 20 keeps the inside of the three-dimensional deposition chamber 2 by the gas atmosphere introduced thereinto by the gas introduction unit 38. In the first embodiment, a gas which is introduced by the gas introduction unit 38 is an inert gas such as nitrogen or argon. The gas introduction unit 38 introduces the inert gas so that the residual oxygen concentration in the three-dimensional deposition chamber 2 becomes 100 ppm or less.

Further, the three-dimensional deposition device 1 may omit step S11, step S13, and step S15 in accordance with the type of powder material. For example, when any problem does not occur in the quality of the three-dimensional object even by the oxidization of the powder material, these steps may be omitted so that the three-dimensional deposition chamber 2 and the spare chamber 3 have atmospheric air. Further, step S13 and step S15 may be continued even after step S16. That is, the gas discharge unit 37 may appropriately discharge air from the three-dimensional deposition chamber 2 while the three-dimensional object is manufactured. Further, the gas introduction unit 38 may appropriately introduce an inert gas into the three-dimensional deposition chamber 2 while the three-dimensional object is manufactured.

When the inert gas is completely introduced into the three-dimensional deposition chamber 2, the control device 20 determines whether to perform a machining operation on the pedestal 91 of the base unit 100 (step S16). For example, the control device 20 measures a surface shape of the pedestal 91 by the shape measurement unit 30. The control device 20 determines whether to perform a machining operation on the pedestal 91 based on a measurement result of the shape measurement unit 30. For example, when surface roughness of the pedestal 91 is larger than a predetermined value, the control device 20 determines that the machining operation is performed on the pedestal 91. Here, the determination on whether the machining operation needs to be performed on the pedestal 91 by the control device 20 is not limited thereto and may not be performed by the measurement result of the shape measurement unit 30. The control device 20 may store, for example, information of the pedestal 91 in the storage unit 53. The control device 20 may determine whether the pedestal 91 needs to be processed based on the information of the pedestal 91 and the three-dimensional object design information. The control device 20 may be set to process the pedestal 91 at all times.

When the control device 20 determines that the machining operation for the pedestal 91 is needed (Yes in step S16), the control device 20 performs the machining operation for the pedestal 91 at a predetermined condition by the machining unit 13 (step S17). The control device 20 determines a condition of the machining operation for the pedestal 91 based on, for example, the shape measurement result of the pedestal 91 obtained by the shape measurement unit 30 or the information of the pedestal 91 and the three-dimensional object design information.

When the control device 20 determines that the processing for the pedestal 91 is not needed (No in step S16) or the machining operation for the pedestal 91 is performed at a predetermined condition, the control device 20 determines the formed layer forming condition based on, for example, the three-dimensional object design information read from the storage unit 53 (step S18). For example, the formed layer forming condition is a condition necessary to form the formed layer and includes a shape of each formed layer, a type of powder P, an injection speed of the powder P, an injection pressure of the powder P, an irradiation condition of the laser beam L, a positional relation among a convergence diameter of the powder P, a spot diameter of the laser beam L, and a formed layer surface, a dimension and a temperature of the melted powder P in air, a dimension of a molten pool formed on a formed layer surface, a cooling speed, or a movement speed of the base unit 100 using the table unit 11.

After the control device 20 determines the formed layer forming condition, the control device 20 injects the powder P toward the pedestal 91 of the base unit 100 and starts emitting the laser beam L thereto by the deposition head 12 (step S19). Since the control device 20 emits the laser beam L while injecting the powder P, the powder P is melted by the laser beam L and the melted powder P can be solidified. Thus, the solid body B is formed on the pedestal 91.

The control device 20 forms the formed layer 92 on the pedestal 91 by moving the base unit 100 using the table unit 11 while injecting the powder P and emitting the laser beam L (step S20). The control device 20 may heat the formed layer 92 or a part to which the solid body B has not been adhered by the heating head 31.

After the formed layer 92 is formed, the control device 20 determines whether a machining operation for the formed layer 92 is needed (step S21). For example, the control device 20 causes the shape measurement unit 30 to measure the surface shape of the formed layer 92. The control device 20 determines whether the machining operation for the formed layer 92 is needed based on the measurement result of the shape measurement unit 30. For example, when the surface roughness of the formed layer 92 is larger than a predetermined value, the control device 20 determines that the machining operation for the formed layer 92 is performed. However, the determination reference of the necessity of the machining operation for the formed layer 92 is not limited thereto. For example, the control device 20 may determine whether the machining operation for the formed layer 92 is needed based on the three-dimensional object design information and the formed layer forming condition. For example, when the surface roughness of the formed layer 92 calculated from the formed layer forming condition is larger than the necessary surface roughness based on the three-dimensional object design information, the control device 20 may determine that the machining operation for the formed layer 92 is needed.

When the control device 20 determines that the machining operation for the formed layer 92 is not needed (No in step S21), a process proceeds to step S24. When the control device 20 determines that the machining operation for the formed layer 92 is needed (Yes in step S21), the control device 20 determines a processing condition of the machining operation for the formed layer 92 (step S22). For example, the control device 20 determines the processing condition based on the measurement result of the shape measurement unit 30, or based on the three-dimensional object design information and the condition of forming the formed layer 92, or the like. After the control device 20 determines the formed layer processing condition, the control device 20 performs the machining operation for the formed layer 92 by the machining unit 13 based on the determined processing condition (step S23).

When the control device 20 performs the machining operation for the formed layer 92 or determines that the machining operation for the formed layer 92 is not needed, the control device determines whether to further deposit the formed layer 93 on the formed layer 92 (step S24). The control device 20 determines whether to further deposit the formed layer 93 on the formed layer 92 based on, for example, the three-dimensional object design information read from the storage unit 73.

When the control device 20 determines that the deposition of the formed layer 93 is needed (Yes in step S24), the process returns to step S18 and the formed layer 93 is deposited on the formed layer 92. When the control device 20 determines that the deposition of the formed layer 93 is not needed (No in step S24), the manufacture of the three-dimensional object is completed.

For example, when a concentration of a gas such as oxygen or nitrogen is high inside the three-dimensional deposition chamber 2, there is a possibility that the powder P may cause, for example, a change such as oxidizing or nitriding. However, in the first embodiment, the gas discharge unit 37 discharges air inside the three-dimensional deposition chamber 2 and the gas introduction unit 38 introduces an inert gas into the three-dimensional deposition chamber 2. Thus, the three-dimensional deposition device 1 according to the first embodiment can suppress deterioration in quality of the three-dimensional object by suppressing a change in quality of the powder P. Further, the gas introduction unit 38 can introduce an arbitrary gas. Thus, the three-dimensional deposition device 1 according to the first embodiment can manufacture the three-dimensional object under an optimal gas atmosphere in response to, for example, the type of powder.

Further, the three-dimensional deposition device 1 according to the first embodiment forms the formed layer by the deposition head 12. Thus, in the first embodiment, the nozzle 23 including the powder injection opening 65a and the laser irradiation opening 65b of the deposition head 12 is disposed inside the three-dimensional deposition chamber 2. Here, the deposition head 12 is a machine that moves in the Z-axis direction. The three-dimensional deposition device 1 according to the first embodiment includes the bellows 18 which seals the inside of the three-dimensional deposition chamber 2 while expanding and contracting in accordance with the movement of the deposition head 12. Thus, the three-dimensional deposition device 1 can suppress deterioration in quality of the three-dimensional object by suppressing deterioration in air-tightness inside the three-dimensional deposition chamber 2 even when an operation machine such as the deposition head 12 is accommodated in the three-dimensional deposition chamber 2. Further, the three-dimensional deposition device 10 has a configuration in which the deposition head 12 is formed as a mechanism moving only in one axis direction as in the embodiment. Therefore it is allowed to dispose the bellows 18 expanding and contracting in one axis direction. Accordingly, since the bellows 18 can expands and contracts while decreasing a load involving with the bellows 18, the inside of the three-dimensional deposition chamber 2 can be further appropriately sealed. Accordingly, it is possible to minimize the configuration of the device and to further easily keep the sealing property compared with the case where the deposition head 12 is moved in a multi-axis direction. Further, the bellows 18 can have a configuration in which only the nozzle 23 of the deposition head 12 is disposed inside the three-dimensional deposition chamber 2. Thus, the three-dimensional deposition device 1 can decrease the volume of the three-dimensional deposition chamber 2 compared with the case where the entire deposition head 12 is disposed inside the three-dimensional deposition chamber 2. For that reason, the three-dimensional deposition device 1 can easily discharge a gas inside the three-dimensional deposition chamber 2 and introduce a predetermined gas thereinto. Further, the bellows 19 and the machining unit 13 have the same relation.

Further, the three-dimensional deposition device 1 includes the spare chamber 3. The spare chamber 3 suppresses the three-dimensional deposition chamber 2 from being directly connected to the outside. Thus, the spare chamber 3 can suppresses a problem in which air flows into the three-dimensional deposition chamber 2 from the outside or an inert gas inside the three-dimensional deposition chamber 2 flows to the outside, for example, when the base unit 100 is carried into or out of the three-dimensional deposition chamber 2. For that reason, it is possible to shorten a time in which the three-dimensional deposition device 1 discharges a gas inside the three-dimensional deposition chamber 2 or introduces a predetermined gas into the three-dimensional deposition chamber 2. Further, the base movement unit 36 moves the base unit 100 into the three-dimensional deposition chamber 2. There is a case where air inside the three-dimensional deposition chamber 2 is discharged. The base movement unit 36 can move the base unit 100 into the three-dimensional deposition chamber 2, for example, even when an operator does not enter the three-dimensional deposition chamber 2.

Second Embodiment

Next, a second embodiment of the invention will be described with reference to the drawings. A three-dimensional deposition device 1A according to the second embodiment is different from the three-dimensional deposition device 1 according to the first embodiment in that the deposition head 12 is provided with a cover unit 120. Since the other configurations of the three-dimensional deposition device 1A according to the second embodiment are similar to those of the three-dimensional deposition device 1 according to the first embodiment, a repetitive description will be omitted.

Figure 10:
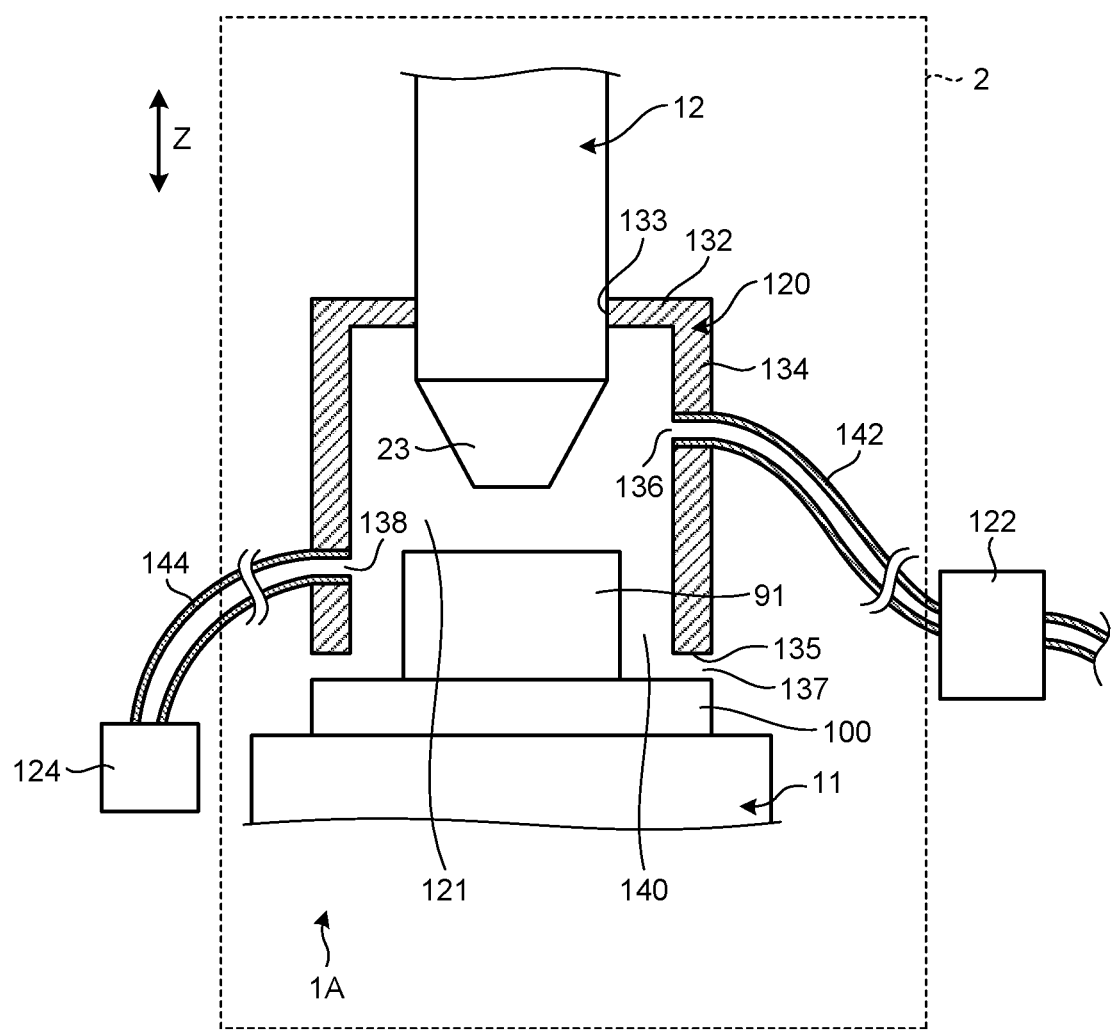
FIG. 10 is a cross-sectional view illustrating an example of a cover unit according to a second embodiment.

FIG. 10 is a cross-sectional view illustrating an example of a cover unit 120 according to the second embodiment. The cover unit 120 is a box-shaped member which forms a space 121 therein. The cover unit 120 covers a position in which the three-dimensional object of the base unit 100 is manufactured. The cover unit 120 adjusts a gas atmosphere in the periphery of the powder P injected from the deposition head 12 by a cover gas discharge unit 122 and a cover gas introduction unit 124 connected to the cover unit 120.

As illustrated in FIG. 10, the cover unit 120 includes an attachment part 132, a wall part 134, a gas discharge opening 136, a gas introduction opening 138, and an opening 140.

The attachment part 132 is a plate-shaped member to which the deposition head 12 is attached. The attachment part 132 includes an opening 133. The wall part 134 is provided along a circumferential direction of the attachment part 132. The wall part 134 extends from the outer periphery of the attachment part 132 to an end 135 in a direction intersecting a face of the attachment part 132. The wall part 134 forms the opening 140 in the inner periphery of the end 135. A part which is surrounded by the attachment part 132 and the wall part 134 forms the space 121.

The gas discharge opening 136 is provided at the wall part 134 and connects the space 121 to the outside of the cover unit 120. The gas introduction opening 138 is provided at the wall part 134 and connects the space 121 to the outside of the cover unit 120. The gas discharge opening 136 is provided near the attachment part 132 in relation to the gas introduction opening 138. However, the positions of the gas discharge opening 136 and the gas introduction opening 138 are not limited thereto as long as the space 121 is connected to the outside of the cover unit 120. The gas discharge opening 136 may be provided near the opening 140 in relation to the gas introduction opening 138. Further, the gas discharge opening 136 and the gas introduction opening 138 may be provided at, for example, the attachment part 132.

The gas discharge opening 136 is connected to the cover gas discharge unit 122 through a discharge tube 142. The cover gas discharge unit 122 is, for example, a vacuum pump. The cover gas discharge unit 122 is controlled by the control device 20 so that air inside the space 121 of the cover unit 120 is discharged. The cover gas discharge unit 122 is controlled by the control device 20. The cover gas discharge unit 122 is provided at the outside of the three-dimensional deposition chamber 2, but may be provided at, for example, the inside of the three-dimensional deposition chamber 2. Further, the cover gas discharge unit 122 may discharge a gas other than air inside the space 121 of the cover unit 120.

The gas introduction opening 138 is connected to the cover gas introduction unit 124 through an introduction tube 144. The cover gas introduction unit 124 is controlled by the control device 20 so that a gas having a predetermined element, for example, an inert gas such as argon and nitrogen is introduced into the space 121 of the cover unit 120. In the second embodiment, the cover gas introduction unit 124 introduces the same gas as the gas introduced into the three-dimensional deposition chamber 2. The cover gas introduction unit 124 is provided at the outside of the three-dimensional deposition chamber 2, but may be provided at, for example, the inside of the three-dimensional deposition chamber 2. Additionally, a gas different from the gas introduced into the three-dimensional deposition chamber 2 may be introduced into the space 121 of the cover unit 120.

The cover unit 120 is attached to the deposition head 12. More specifically, the cover unit 120 is attached to the deposition head 12 so that the nozzle 23 of the deposition head 12 is accommodated in the space 121 through the opening 133 of the attachment part 132. The deposition head 12 and the opening 133 of the attachment part 132 are sealed. Since the cover unit 120 is attached to the deposition head 12, the opening 140 is opened downward in the Z-axis direction. Next, a method of adjusting a gas atmosphere in the periphery of the powder P by the cover unit 120 will be described.

Figure 11:
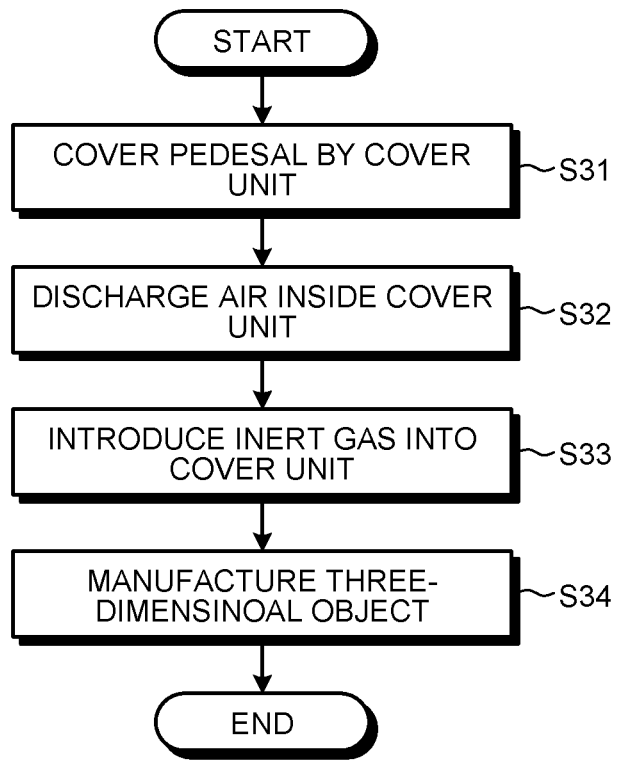
FIG. 11 is a flowchart illustrating a step of adjusting a gas atmosphere in the periphery of powder by the cover unit according to the second embodiment.

FIG. 11 is a flowchart illustrating a step of adjusting a gas atmosphere in the periphery of the powder P by the cover unit 120 according to the second embodiment. The control device 20 discharges air inside the three-dimensional deposition chamber 2 and introduces an inert gas into the three-dimensional deposition chamber 2. Next, the control device 20 moves the base unit 100 by the table unit 11 so that the cover unit 120 covers the pedestal 91 of the base unit 100 (step S31). The end 135 of the cover unit 120 is located above the base unit 100 in the Z-axis direction. Since the cover unit 120 moves along with the deposition head 12, the control device 20 forms the space 137 without contacting the end 135 of the cover unit 120 and the base unit 100 to each other. Additionally, the cover unit 120 may not cover the entire pedestal 91 if a position where the three-dimensional object of the base unit 100 is manufactured is covered. For example, the cover unit 120 may cover only an upper face of the pedestal 91 in the Z-axis direction. Additionally, in step S31, the control device 20 may move the deposition head 12 in the Z-axis direction so that the cover unit 120 covers the pedestal 91 of the base unit 100.

When the control device 20 moves the base unit 100 so that the cover unit 120 covers the pedestal 91, the control device 20 discharges air inside the space 121 in the cover unit 120 by the cover gas discharge unit 122 (step S32). Since the control device 20 discharges air by the cover gas discharge unit 122, an oxygen concentration inside the cover unit 120 is set to 100 ppm or less and desirably 10 ppm or less, for example. Since the control device 20 sets the oxygen concentration inside the cover unit 120 to 100 ppm or less, an inert state is formed. Further, since the control device 20 sets the oxygen concentration to 10 ppm or less, an inert state is further reliably formed.

After the control device 20 discharges air inside the space 121 of the cover unit 120, the control device 20 introduces an inert gas into the space 121 in the cover unit 120 by the cover gas introduction unit 124 (step S33). The control device 20 forms an atmosphere of an inert gas introduced into the space 121 in the cover unit 120 by the cover gas introduction unit 124. In the second embodiment, a gas which is introduced by the cover gas introduction unit 124 is an inert gas such as nitrogen or argon which is similar to a gas introduced into the three-dimensional deposition chamber 2 by the gas introduction unit 38. The gas introduction unit 38 introduces an inert gas so that the residual oxygen concentration in the three-dimensional deposition chamber 2 becomes 100 ppm or less.

After the control device 20 introduces the inert gas into the space 121 of the cover unit 120, the control device 20 manufactures a three-dimensional object by the deposition head 12 (step S34). That is, the control device 20 starts to manufacture the three-dimensional object after the control device 20 introduces the inert gas into the space 121 of the cover unit 120. Since the pedestal 91 is accommodated in the space 121, the formed layer 92 is formed inside the space 121 having the inert gas atmosphere. When the three-dimensional object is completely manufactured, the step ends. Additionally, step S32 and step S33 are continuously performed even in step S34. That is, the control device 20 continuously discharges air inside the space 121 in the cover unit 120 by the cover gas discharge unit 122 while the three-dimensional object is manufactured. Further, the control device 20 continuously introduces an appropriate inert gas into the space 121 in the cover unit 120 while the three-dimensional object is manufactured. However, the control device 20 may appropriately discharge air inside the space 121 and introduce an inert gas into the space 121 in response to, for example, the oxygen concentration and the inert gas concentration inside the space 121.

In this way, the three-dimensional deposition device 1A according to the second embodiment includes the cover unit 120. The cover unit 120 covers the pedestal 91, discharges the air inside the space 121 accommodating the pedestal 91, and introduces the inert gas into the space 121. That is, the three-dimensional deposition device 1A according to the second embodiment additionally discharges the air from a position where the formed layer 92 is formed and introduces the inert gas into the three-dimensional deposition chamber, after forming the inert gas atmosphere inside the three-dimensional deposition chamber 2. Thus, the three-dimensional deposition device 1A according to the second embodiment can further appropriately form the inert gas atmosphere in the periphery of the formed layer 92. For that reason, the three-dimensional deposition device 1A according to the second embodiment can suppress deterioration in equality of the three-dimensional object by suppressing a change in quality of the powder P. Further, the cover gas introduction unit 124 can introduce an arbitrary gas. Thus, the three-dimensional deposition device 1A according to the second embodiment can manufacture the three-dimensional object under an optimal gas atmosphere in response to, for example, the type of powder.

Further, the three-dimensional deposition device 1A according to the second embodiment discharges the air inside the cover unit 120 and introduces the inert gas while the three-dimensional object is manufactured. Thus, the three-dimensional deposition device 1A according to the second embodiment can appropriately form the inert gas atmosphere inside the cover unit 120 even when the space 137 is formed between the end 135 of the cover unit 120 and the base unit 100.

Further, the gas introduction opening 138 is provided below the gas discharge opening 136 in the Z-axis direction. Since the gas introduction opening 138 is provided below the gas discharge opening 136 in the Z-axis direction, the three-dimensional deposition device 1A can appropriately charge an argon gas into the cover unit 120 when argon having a specific weight higher than that of a gas such as oxygen in air is used as an introduction gas. Additionally, when the introduction gas is set to a gas lighter than air, the gas introduction opening 138 and the gas discharge opening 136 may be disposed in an opposite way.

When an argon gas having a specific weight higher than that of a gas such as oxygen in air is introduced into the cover unit 120, it is desirable that the gas introduction opening 138 be provided above the pedestal 91 in the Z-axis direction. The argon gas having a specific weight higher than that of a gas such as oxygen in air is apt to move downward in the Z-axis direction. Since the gas introduction opening 138 is provided above the pedestal 91 in the Z-axis direction, the three-dimensional deposition device 1A according to the second embodiment can further appropriately move the introduced argon gas to the periphery of the formed layer 92. Additionally, when the introduction gas is a gas lighter than air, it is desirable that the gas introduction opening 138 be provided below the pedestal 91 in the Z-axis direction.

While the embodiments of the invention have been described, the embodiments are not limited to the content of these embodiments. Further, the above-described components include a component which is easily supposed by the person skilled in the art, a component which has substantially the same configuration, and a component which is in a so-called equivalent scope. The above-described components can be appropriately combined with one another. Additionally, various omissions, substitutions, or modifications of the components can be made without departing from the spirit of the above-described embodiments. Additionally, various omissions, substitutions, or modifications of the components can be made without departing from the spirit of the above-described embodiments. For example, the three-dimensional deposition device 1 according to the embodiment is not limited to a configuration in which the deposition head 12 injects the powder P and irradiates the powder P with the laser beam L. The three-dimensional deposition device 1 may be configured to supply the powder P, irradiate the powder P with the laser beam L to form the formed layer, and perform an appropriate machining operation on the formed layer. For example, the three-dimensional deposition device 1 may form the formed layer by forming a powder layer by a powder supply unit and irradiating a part of the powder layer with the laser beam L to sinter the powder. Further, for example, the three-dimensional deposition device may have a configuration in which the control device 20 is connected to an external device via a communication line such as the Internet and a processing condition, for example, a formed layer forming condition is changed and set based on an instruction input from the external device. That is, the three-dimensional deposition device may change the processing condition from the external device by the communication using the communication line.

REFERENCE SIGNS LIST

1 THREE-DIMENSIONAL DEPOSITION DEVICE
2 THREE-DIMENSIONAL DEPOSITION CHAMBER
3 SPARE CHAMBER
4 DEPOSITION HEAD ACCOMMODATION CHAMBER
4a, 5a Z-AXIS SLIDE UNIT
5 MACHINING UNIT ACCOMMODATION CHAMBER
6, 7 DOOR
10 BED
11 TABLE UNIT
12 DEPOSITION HEAD
13 MACHINING UNIT
15 Y-AXIS SLIDE UNIT
16 X-AXIS SLIDE UNIT
17 ROTATION TABLE UNIT
18, 19 BELLOWS
20 CONTROL DEVICE
22 TOOL
23 NOZZLE
25 SPARE CHAMBER GAS DISCHARGE UNIT
30 SHAPE MEASUREMENT UNIT
31 HEATING HEAD
32 MACHINING MEASUREMENT UNIT
33 TOOL EXCHANGE UNIT
34 NOZZLE EXCHANGE UNIT
35, 35A POWDER INTRODUCTION UNIT
36 BASE MOVEMENT UNIT
37 GAS DISCHARGE UNIT
38 GAS INTRODUCTION UNIT
39 POWDER COLLECTION UNIT
41, 42 FACE
43, 44, 45 OPENING
50 SPACE
51 BELLOWS PART
53 GUIDE PART
53a, 53b, 53c SUB-GUIDE PART
55 PROTRUDING PART
56 GROOVE PART
58a, 58b, 59b, 59c MOVABLE PART
61 OUTER TUBE
62 INNER TUBE
63 POWDER PASSAGE
64 LASER PATH
65a POWDER INJECTION OPENING
65b LASER IRRADIATION OPENING
66 MAIN BODY
67 LIGHT SOURCE
68 OPTICAL FIBER
69 LIGHT CONCENTRATING UNIT
71 INPUT UNIT
72 CONTROLLER
73 STORAGE UNIT
74 OUTPUT UNIT
75 COMMUNICATION UNIT
80 SPACE
81, 81A POWDER STORAGE UNIT
82, 82A POWDER IDENTIFICATION UNIT
83 CARTRIDGE
84 MATERIAL DISPLAY PART
85 INTRODUCTION PART
86 CYCLONE PART
87 GAS DISCHARGE UNIT
88 POWDER DISCHARGE PART
91 PEDESTAL
92, 93 FORMED LAYER
100 BASE UNIT
102, 104, 106, 108 ARROW
120 COVER UNIT
121 SPACE
122 COVER GAS DISCHARGE UNIT
124 COVER GAS INTRODUCTION UNIT
132 ATTACHMENT PART
133 OPENING
134 WALL PART
135 END
136 GAS DISCHARGE OPENING
137 SPACE
138 GAS INTRODUCTION OPENING
140 OPENING
A MOLTEN BODY
B SOLID BODY
L LASER BEAM
P POWDER

The invention claimed is:

1. An additive manufacturing device which builds a three-dimensional object by injecting a powder material to a target region while irradiating the powder material with a laser beam and thereby forming an additive layer in the target region, comprising:
a base unit on which the three-dimensional object is built;
a deposition chamber accommodating the base unit;
a hat-shaped cover provided inside the deposition chamber, the hat-shaped cover and the base unit defining the target region, the target region being configured to have a gas atmosphere different from a gas atmosphere outside hat-shaped cover;
a deposition head attached to the hat-shaped cover and configured to inject the powder material in the target region;
a first gas introducer which controls a first residual oxygen concentration by introducing and supplying an inert gas into the target region when forming the three-dimensional object, and
a device controller which controls an operation of the additive manufacturing device and a supplying condition of the inert gas supplied by the first gas introducer, wherein
the device controller is capable of;
storing an information in a memory, the information includes at least one of (i) an operation program of the additive manufacturing device, (ii) an information of the additive manufacturing device, and (iii) a design information of the three-dimensional object for determining a forming condition of the additive layer, and
determining the supplying condition of the inert gas to the target region based on the information stored in the memory to achieve a certain first gas atmosphere having a predetermined residual oxygen concentration in accordance with a type of the powder material used in forming the three-dimensional object.

2. The additive manufacturing device according to claim 1, further comprising:
a reader which acquires a material information displayed on a cartridge at least partially filled with the powder material;
a carrying path to which the powder material is input from the cartridge and from which powder material is output toward the target region, and
a powder identifier which identifies the type of the powder material in the cartridge based on the material information acquired by the reader.

3. The additive manufacturing device according to claim 2, wherein,
the memory stores a relationship between the type of the powder material used in forming the three-dimensional object and the forming condition of the additive layer, and
the device controller determines the appropriate forming condition of the additive layer based on the identified type of the powder material and the relationship.

4. The additive manufacturing device according to claim 1, wherein,
the first gas introducer introduces the inert gas such that substantially a whole area in the target region becomes the certain first gas atmosphere having the predetermined residual oxygen concentration.

5. The additive manufacturing device according to claim 1, wherein,
the first gas introducer introduces the inert gas such that the target region becomes the certain first gas atmosphere having the predetermined residual oxygen concentration.

6. The additive manufacturing device according to claim 1, further comprising:
a second gas introducer which introduces the inert gas such that substantially a whole area in the deposition chamber outside the hat-shaped cover becomes a certain second gas atmosphere having a second predetermined residual oxygen concentration, wherein
the first gas introducer introduces the inert gas such that a periphery of the target region becomes the certain first gas atmosphere having a first predetermined residual oxygen concentration.

7. The additive manufacturing device according to claim 1, wherein,
the first residual oxygen concentration is same as or less than 100 ppm.

8. The additive manufacturing device according to claim 1, wherein,
the first residual oxygen concentration is same as or less than 10 ppm.

9. The additive manufacturing device according to claim 1, further comprising:
a first gas discharger which discharges a gas from the target region.

10. The additive manufacturing device according to claim 9, wherein,
the first gas introducer includes a first opening for introducing the inert gas into the target region, and
the first gas discharger includes a second opening for discharging the gas from the target region, and a vertical position of the first opening is lower than that of the second opening.

11. The additive manufacturing device according to claim 1, wherein:
the first gas introducer introduces the gas such that a periphery of the target region becomes the certain first gas atmosphere having the predetermined residual oxygen concentration.

12. The additive manufacturing device according to claim 11, wherein
the first gas introducer is located below the first cover gas discharger.

13. The additive manufacturing device according to claim 1, further comprising:
a first gas discharger which discharges air inside the deposition chamber to an outside of the target region,
wherein the first gas introducer is provided below the first gas discharger when a weight of the inert gas supplied into the target region is higher than a weight of the air inside the target region.

14. The additive manufacturing device according to claim 1, further comprising:
a first gas discharger which discharges air inside the target region to an outside of the target region,
wherein the first gas introducer is provided above the first gas discharger when a weight of the inert gas supplied into the target region is lower than a weight of the air inside the target region.

* * * * *